(12) United States Patent
Morrison et al.

(10) Patent No.: US 7,325,076 B1
(45) Date of Patent: Jan. 29, 2008

(54) SYSTEM FOR DYNAMIC INFORMATION EXCHANGE

(75) Inventors: Thomas G. Morrison, Boston, MA (US); Stanley Y. Huang, Boston, MA (US); Jeffrey S. Daly, Windham, NH (US); David N. Dupre, Brookline, MA (US)

(73) Assignee: NaviMedix, Inc., Boston, MA (US)

( * ) Notice: Subject to any disclaimer, the term of this patent is extended or adjusted under 35 U.S.C. 154(b) by 449 days.

(21) Appl. No.: 09/711,618

(22) Filed: Nov. 13, 2000

Related U.S. Application Data

(60) Provisional application No. 60/164,575, filed on Nov. 10, 1999.

(51) Int. Cl.
*G06F 15/16* (2006.01)

(52) U.S. Cl. ............... 709/246; 709/203; 709/217; 709/223; 709/230

(58) Field of Classification Search ........ 709/217–219, 709/203, 202, 228, 230, 246, 223; 707/10; 705/2, 3, 4

See application file for complete search history.

(56) References Cited

U.S. PATENT DOCUMENTS

| | | | | |
|---|---|---|---|---|
| 5,239,662 | A * | 8/1993 | Danielson et al. | 709/230 |
| 5,859,973 | A * | 1/1999 | Carpenter et al. | 709/203 |
| 5,881,230 | A * | 3/1999 | Christensen et al. | 709/203 |
| 5,890,129 | A * | 3/1999 | Spurgeon | 709/217 |
| 5,905,736 | A * | 5/1999 | Ronen et al. | 370/546 |
| 5,930,759 | A * | 7/1999 | Moore et al. | 705/3 |
| 5,978,577 | A * | 11/1999 | Rierden et al. | 707/10 |
| 6,112,183 | A * | 8/2000 | Swanson et al. | 709/203 |
| 6,125,352 | A * | 9/2000 | Franklin et al. | 705/26 |
| 6,275,863 | B1 * | 8/2001 | Leff et al. | 709/248 |
| 6,283,761 | B1 * | 9/2001 | Joao | 434/236 |
| 6,310,888 | B1 * | 10/2001 | Hamlin | 370/466 |
| 6,343,271 | B1 * | 1/2002 | Peterson et al. | 705/4 |
| 6,400,729 | B1 * | 6/2002 | Shimadoi et al. | 370/466 |
| 6,424,996 | B1 * | 7/2002 | Killcommons et al. | 709/218 |
| 6,426,759 | B1 * | 7/2002 | Ting et al. | 715/763 |
| 6,446,109 | B2 * | 9/2002 | Gupta | 709/203 |
| 6,453,297 | B1 * | 9/2002 | Burks et al. | 705/3 |
| 6,466,937 | B1 * | 10/2002 | Fascenda | 707/10 |
| 6,535,880 | B1 * | 3/2003 | Musgrove et al. | 707/10 |
| 6,665,647 | B1 * | 12/2003 | Haudenschild | 705/2 |
| 6,735,569 | B1 * | 5/2004 | Wizig | 705/4 |
| 6,757,898 | B1 * | 6/2004 | Ilsen et al. | 709/203 |
| 6,804,558 | B2 * | 10/2004 | Haller et al. | 607/30 |

(Continued)

OTHER PUBLICATIONS

Microsoft Computer Dictionary, Fifth Edition, 2002, pp. 114,232,418.*

*Primary Examiner*—Ario Etienne
*Assistant Examiner*—Ramy M Osman
(74) *Attorney, Agent, or Firm*—Hamilton, Brook, Smith & Reynolds, P.C.

(57) ABSTRACT

The communication bridge enables trading partner customers to mass customize their interactions with their affiliated trading partners by controlling workflow and data presentation. A method and system allows the integration of standard and proprietary content, such as data and "look-and-feel" elements, from trading partners to be presented via a standard interface for the purpose of conducting mass customized interactions (transactions, communications). There is a high degree of variability in screen and workflow presentation. A particular Application Programming Interface (API) facilitates the dynamic exchange of information between disparate trading partners and end users.

70 Claims, 15 Drawing Sheets

U.S. PATENT DOCUMENTS

| | | | |
|---|---|---|---|
| 6,810,429 B1 * | 10/2004 | Walsh et al. | 709/246 |
| 6,915,266 B1 * | 7/2005 | Saeed et al. | 709/201 |
| 6,940,870 B2 * | 9/2005 | Hamlin | 709/223 |
| 7,085,804 B2 * | 8/2006 | Nolte | 709/246 |
| 7,120,636 B2 * | 10/2006 | Pendleton | 709/217 |

* cited by examiner

Log View

| Referral / Auth Log | TaskCentral | PlanCentral | Action Items | | NAVIMEDIX™ | logout |

Quick Search: Display referrals/authorizations where the

Patient's Name Begins With: [ ▼ ]  [ GO ] ← 44a

[ Create Referral/Auth. ] ← 46    [ Patient Search ] ← 44b    [ Full Search ] ← 44c Quick Search Results
Records 1-2 of 1, Page 1

| Patient<br>Plan | DOB<br>Plan Member ID | Status<br>Auth. Code | PCP<br>Specialist | Req Type<br>Req Date | # Visits<br>Exp Date |
|---|---|---|---|---|---|
| EVANS, AUDREY | 12/01/1980 | Incomplete | GREEN, MARK | | N/A |
| Healthy Options HMO | 123451234 | N/A | N/A | 11/20/2000 | N/A |
| FALLON, DAISY | 07/15/2000 | Pending Plan Approval | AUSTIN, KATE | Authorization | N/A |
| Good Care Health Plan | 543298765 | N/A | N/A | 11/20/2000 | N/A |

Records 1-2 of 1 page 1

42a, 42, 42b indicate patient rows; 43a, 43b indicate icons; 40 indicates overall view.

FIG. 5

| Referral / Auth Log | TaskCentral | PlanCentral | Action Items | | NAVIMEDIX™ | logout |

GoodCare Health Plan

Patient Search — 72

Referred From Billing Provider Name: METRO INTERNAL MEDICINE
Member ID Number: 123498765
Patient Last Name: JONES
Patient First Name: DAKOTA
Proposed Date of Service: 11/15/2000

[Search]   [Clear All Fields]

Records 1-1 of 1, page: 1

| Name | Gender | Patient Date of birth | line of Business | Select |
|---|---|---|---|---|
| JONES, DAKOTA | MALE | 02/26/1977 | HMO | |

Records 1-1 of 1, page: 1

FIG. 8

GoodCare Health Plan

Your cardiology referral cannot be approved without additional information.

Please complete the following form and resubmit

Please check all that apply: — 82

☐ Evaluated chest pain, murmurs, and palpitations, and recognize significant heart disease by history, examination, electrocardiogram and echocardiogram, and stress electrocardiogram including thallium scintigraphy ☐ Evaluated and treated coronary risk factors including smoking, hyperlipidemia, diabetes, and hypertension ☐ Treated hypertension, congestive heart failure, stable angina, and non life-threatinging arrhythimias ☐ Treated angina medically with nitrates, beta-blockers, calcium channel blockers and other medication as appropriate ☐ Determined whether syncope is cardiac, ie. valvular or arrhythmic, by history, examination, electrocardiogram, ambulatory monitoring and echocardiogram Requesting the following consults:
☐ unstable angina post MI          ☐ intractable heart failure and arrhythmias
☐ angina post subendocardial MI    ☐ pericardial effusion
☐ angina despite maximal medical therapy with minimally tolerated doses of nigrates, beta-blockers, and calcium channel blockers          ☐ congenital or valvular disease - - consult only for non-invasive studies and to define appropriate follow-up

SUBMIT REFERRAL

GoodCare Health Plan — Case or Disease Management Referral    NAVIMEDIX™

Referral / Auth Log   TaskCentral   PlanCentral   Action Items   logout

Tracking Number: P010000100  92
Status: APPROVED
Authorization Number: 54321123  94

Member ID Number: 123498765    Patient Name: JONES, DAKOTA
Line of Business: HMO    Patient Phone Number: 814-555-0226

Referred from:
Billing Provider Number: 000960000
Billing Provider Name: METRO INTERNAL MEDICINE ASSOCS.
Service Provider Name: AUSTIN, KATE, MD
Address: 99 BEDFORD STREET, PITTSBURGH, PA 15244
Phone Number: 814-555-2000
Fax Number: 814-555-9999
Entered By: Madge Primary Diagnosis Code: 410    Primary Diagnosis Description: ACUTE MYOCARDIAL INFRACTION Requested Service: Congestive Heart Failure Brief Medical History:
2 MIs requiring impatient care.

Reason for Referral:
Chronic chest pain.

Submit    Review Notes    View Referral/Auth    Go to Previous Form/Auth

SYSTEM FOR DYNAMIC INFORMATION EXCHANGE

RELATED APPLICATIONS

This application claims the benefit of U.S. Provisional Application No. 60/164,575, filed on Nov. 10, 1999, the entire teachings of which are incorporated herein by reference.

BACKGROUND

Many business transactions involve the exchange of information between end-users and trading partners. End-users typically rely on manual processes, including faxing and phone calling, to submit transaction requests to their trading partners. Where electronic transactions are conducted between end-users and trading partners, they are typically asynchronous with significant latency.

For example, consider a transaction submitted by an end-user to a trading partner. Typically, the trading partner first batches similar transactions, and then processes them. If more information is needed from the end-user, the trading partner sends a request for information. The end-user may batch these requests before responding to them. This back and forth transmission of batched requests for information, responses, and attempts to re-process the transaction may occur multiple times, over a span of days or potentially weeks, before all the required information can be compiled to process the transaction. This inefficient process is both time and labor intensive, and ultimately adds to the cost of doing business between the end-user and the trading partner.

The advent of the Internet and its increasing use in business has launched many business-to-business e-commerce companies. Their solutions attempt to force a common data model and data presentation format that trading partners must accept, or attempt to change through the e-commerce company's standards committee. Often these solutions are designed only for one trading partner. Thus, an end-user uses different applications from multiple sources to communicate with the many trading partners with which they conduct business. Disparate systems increase the learning curve for end-users and are disruptive to the end-users' workflow.

SUMMARY

A system architecture in accordance with an embodiment of the invention supports dynamic interchanges (e.g., informational inquiries, approval requests and notifications) between any type of end-user and trading partner using a wide variety of devices. A particular embodiment of the invention combines a unique system architecture with an innovative business model to create a solution to balance the needs of trading partners and end-users.

A particular embodiment can includes a system for exchanging data between a user and a database. The system can include a user interface for interacting with the user, a plurality of remote transaction systems, and a communication bridge in connection with the user interface and transaction systems.

The user interface receives input data from the user. The user interface is a graphical user interface, such as an Internet web browser.

Each transaction system can independently manage a respective database. Typically, the databases are disparate. The selected transaction system can include processing logic responsive to the user's input data. Furthermore, the processing logic can determine additional data to be input by the user.

The communication bridge can include a first communication protocol for communicating with the user interface and a second communication protocol for communicating with a selected transaction system. The first communication protocol can include an Internet protocol and the second communication protocol can include a messaging protocol. Furthermore, the communication bridge can include a third connection protocol for communicating with a second selected transaction system.

The system can further include a store of displayed forms, where each display form can solicit input data from the user. In particular, a specific display form can be communicated to the user interface in response to a business model of the selected transaction system. The specific display form can, more particularly, be determined from input data.

More particularly, a system for exchanging data between a user and a database can include a plurality of end user systems, a plurality of remote transaction systems, and a communication bridge in communication with the end user systems and the transaction systems. Each end user system can have a user interface for presenting virtual forms for data collection and data display. Each transaction system can have data stored in a database and a set of rules for using a plurality of forms to collect data for the database.

The communication bridge can include a first data communication server for communicating with the transaction systems, a second data communication server for communicating with the end user systems, and a network structure connecting the first server with the second server. The first server can include a conversational interface to the transaction systems. The second server can be an Internet web server. In addition, the communication bridge can manage exchanges of information between one end user system and many transaction systems. That one-to-many relationship can complete a single transaction for the end user system.

Specifically, a virtual form can be presented to the user under command of the set of rules of a specific transaction system. Input data collected from the user by the virtual form can be stored in the database of the specific transaction system. The communication bridge can derive the specific transaction system from input data collected from the user by a previously presented virtual form.

Furthermore, the transaction system can include a legacy transaction system. The transaction system can also include a transaction server in communication with the first server. The transaction server can directly update data on the legacy transaction system. In addition, the transaction server can store updates to data for delayed forwarding to the legacy transaction system.

From a user's perspective, a computer system can exchange data between a user and a plurality of database transaction systems using an application program on a client computer. The application program can display forms for exchanging information with the user under control of a remote communication bridge. In a particular embodiment, the application program can be an Internet web browser.

A first set of programming instructions received from the communication bridge can be executed by the application program to display a first specific form. The first specific form can be associated with a first transaction system. In addition, a second set of instructions can be received from the communication bridge to display a second specific form, which may result from input data to the first specific form. The second specific form can be associated with a second transaction system.

Flexibility to the system is provided by a particular computer interface. The interface can include a set of messages defining an exchange of information between a plurality of disparate computers. That information can include data defining a form for display to a user on a user computer and input data from the user in response to the displayed form. The input data can affect execution of a target computer. The information is specifically health care related information. The messages can be defined by an Application Programming Interface (API) syntax. The use of the interface can insulate the users from trading partner-specific integration.

For trading partners, the resulting system can incorporate their proprietary business rules and data structures into the application that end-users use to conduct daily business. For end-users, the resulting system can provide a single point of access to conduct mission critical transactions with multiple trading partners, simplifying daily workflow.

In particular, a single query can be used to support multiple transactions. In addition, transactions can be stopped in mid-process and saved. The transaction can later be restored so it can be completed or assigned to another user for completion. Furthermore, a group or consortium of trading partners can use the same forms for some transactions and distinct forms for other transactions. In addition, the trading partners in the group can each have a different approach to back-end integration.

A trading partner can also delegate transactions to other trading partners or third party organizations. The delegation can include routing the transactions to different entities based on business functions. The delegates can perform specific functions based on behalf of the originating partner. The appropriate forms can be presented and business rules can be applied by the third party. The third party can communicate with the user either via the original partner or via its own connection through the communication bridge.

BRIEF DESCRIPTION OF THE DRAWINGS

The foregoing and other objects, features and advantages of the invention will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a user display for viewing a transaction log.

FIG. 8 is a user display for viewing a patient search action.

FIG. 11 is a user view of a subsequent referral form.

FIG. 12 is a user view of an authorization referral form.

DETAILED DESCRIPTION

Figure 1:
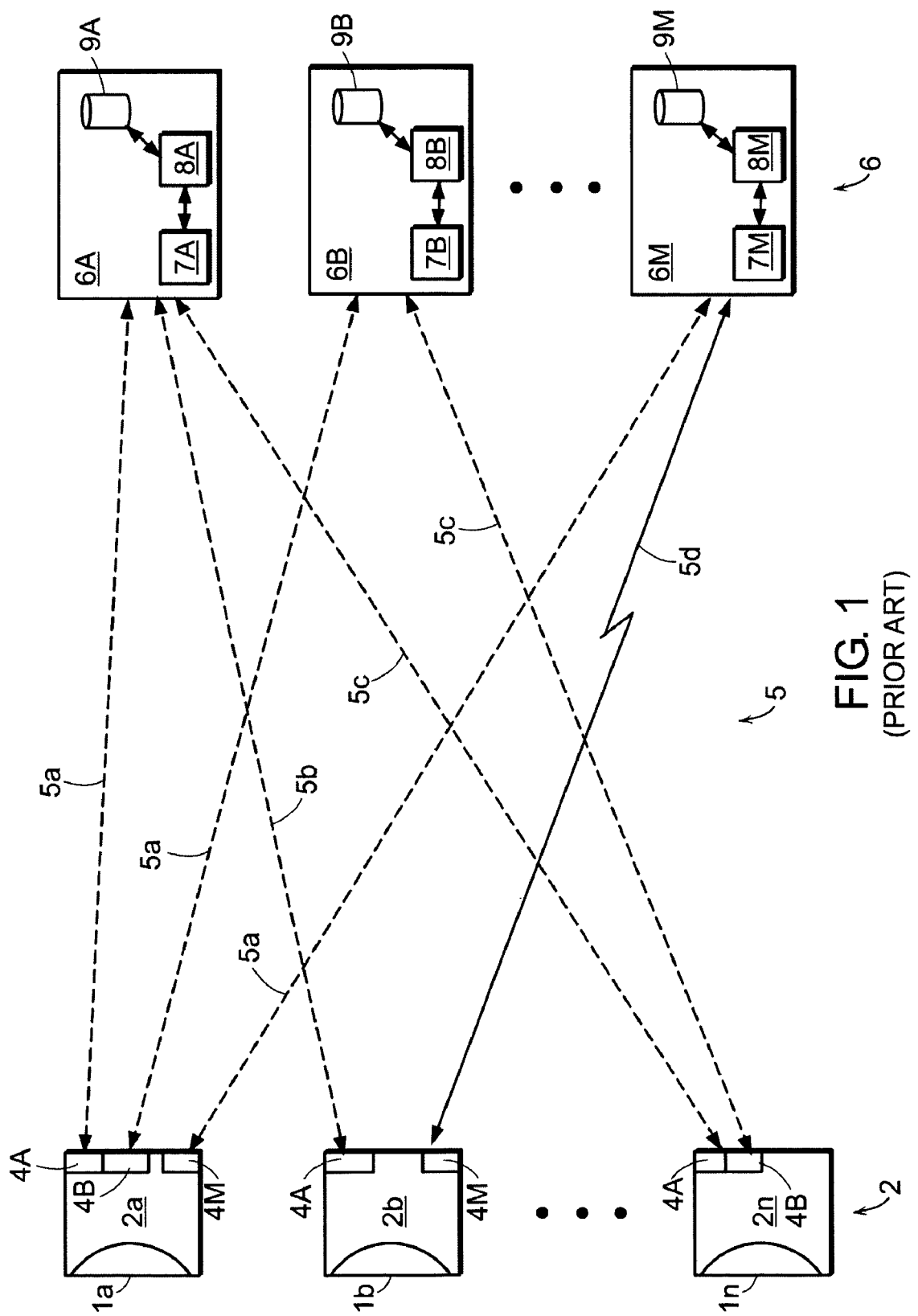
FIG. 1 is a schematic block diagram of a prior art system for exchanging information.

FIG. 1 is a schematic block diagram of a prior art system for exchanging information. Shown are a plurality of end-user systems 2a, 2b, . . . , 2n and a plurality of transaction systems 6A, 6B, . . . , 6M. Each end user system 2 exchanges information with at least one transaction system 6 via various communication channels 5, including voice telephone 5a, data telephone 5b (including facsimile and modem), mail 5c, and direct data connection 5d. In a particular embodiment, the end-user systems 2 represent suppliers of health care services, such as physician offices and hospitals, and the transaction systems represent health care trading partners, such as insurance companies or health plans.

Each transaction system 6A, 6B, . . . , 6M includes a respective database 9A, 9B, 9M for storing the information received from the end-user systems 2 and from other sources. In addition, each transaction system 6 has a respective workflow model 7A, 7B, . . . , 7M that they follow to gather information from the end-users. The workflow models 7A, 7B, . . . , 7M communicate with respective database engines 8A, 8B, . . . , 8M to transact with the databases 9A, 9B, . . . , 9M.

Each end-user system 2 can be standalone computers or a network of computers. Each end-user system 2 may be running software applications 4A, . . . , 4M specifically tailored to each transaction systems 6A, . . . , 6M with which the end-user partners. The software applications 4 interface with users to display forms 1a, 1b, . . . , 1n to gather information in accordance with the transaction system's 6 workflow model 7.

As can be appreciated, the health care industry, despite advances in medical technology, still heavily relies on manual business processes. It has been estimated that approximately 25% of every healthcare dollar is wasted through the delivery of unnecessary care, performance of redundant tests and procedures, and excessive administrative costs. A major contributor to these costs is the manual processing of 85% of all prior art healthcare transactions currently done via paper, fax or phone. The limited automation between the physician office and their trading partners creates an opportunity to replace the tangle of phone calls, faxes and paper forms with a single real-time solution that delivers online notification, verification, inquiry and submission transactions to physician offices.

The healthcare industry has many unique characteristics. For one thing, it is a highly fragmented marketplace with an enormous number of trading partners. The delivery of healthcare requires frequent interaction among these trading partners, centered on the physician and the physician office. In addition, healthcare trading partners use proprietary business rules to reflect their specific business requirements as well as to maintain competitive differentiation. Any workflow management solution should therefore accommodate multiple trading partners and each of their proprietary rules.

Despite the healthcare industry having made some inroads in establishing standard data formats such as certain ANSI X.12 electronic data interchange (EDI) formats and Health Level-7 (HL-7), the need for trading partners to maintain their proprietary rules has resulted in complex transactions and has limited the adoption of many industry-wide standards.

Trading partners, having made significant investments in their information systems and processes, want to maximize these investments. These core transaction systems often, however, contain incompatible data sources, which adversely affect the ability of trading partners to execute transactions and communicate patient-specific information with physician offices. In addition, implementing new business approaches often requires replacing or upgrading these systems. This often requires lead times that typically range from nine to twelve months.

Still, approximately 85% of all prior art healthcare transactions are voice, paper or fax-based. Despite substantial investment in their information systems, healthcare trading partners have not integrated their mission-critical processes with physician offices, resulting in significant operational inefficiencies.

A particular solution to the above problems is a system that enables the real-time mass customization of healthcare business processes and streamlines physician office interactions with multiple trading partners. A particular system directly addresses the critical business needs of its targeted trading partner customers. A particular system provides efficient communication links that reduce administrative costs and improve quality of service. The system automates the current paper-, fax- and phone-based physician office-to-trading partner interactions with a real-time application. It provides a single point of access for physicians to work with their multiple trading partners, while providing trading partners with individualized access to the highly fragmented physician office marketplace.

A particular system architecture does not require trading partners to adopt standardized data formats or transaction processing, nor to relinquish control of their proprietary data. This ability overcomes one of the major historical barriers to automating communications with physician offices because competing organizations need not agree upon or maintain joint data standards. The architecture allows each trading partner customer to maintain its proprietary data standards in communicating with physician offices and allows it to extend its electronic communications to more complex and unique transactions. In addition, the system allows competing trading partners to maintain their competitive differentiation based on their core competencies: business rules, processes, and branding.

A particular system allows trading partners to leverage their substantial investments in core transaction systems. Trading partners have the flexibility to retain business rules and data on their existing systems, or to transfer part or all of their rules and data to proxies in the system. The system architecture allows the system to link to core transaction systems, leveraging their programming and processing power, or to support rules and data on another platform.

The particular solution enables trading partner customers to mass customize their interactions with their affiliated trading partners by controlling workflow and data presentation. The solution is a method (process) or system that allows the integration of standard and proprietary content such as data and "look-and-feel" elements from trading partners to be presented via a standard interface for the purpose of conducting mass customized interactions (transactions, communications).

Figure 2:
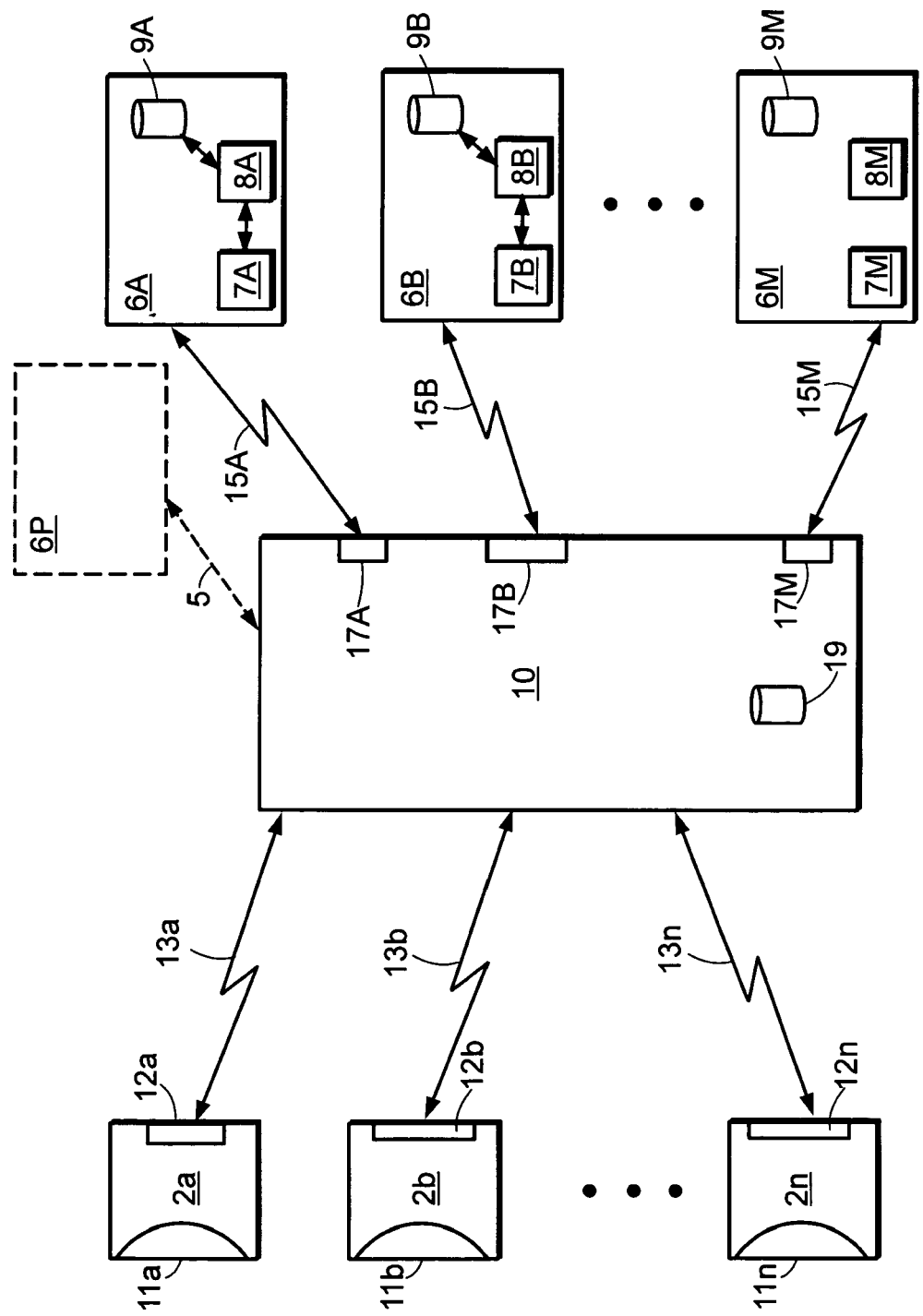
FIG. 2 is a schematic block diagram of a system for information interchange.

FIG. 2 is a schematic block diagram of a system for information interchange. The prior art communication channels 5 (FIG. 1) are replaced by a communication bridge 10, which communicates with the end-user systems 2a, 2b, . . . , 2n via a respective end-user communication link 13a, 13b, . . . , 13n and with the transaction systems 6A, 6B, 6M via a respective trading partner communication link 15A, 15B, . . . , 15M. Also shown is an off-system trading partner 6P, which is communicated with via a legacy communication channel 5 (FIG. 1).

Each end-user system 2a, 2b, . . . , 2n includes a respective user interface 11a, 11b, . . . , 11n, such as a graphical user interface (GUI), for inputting data from and outputting data to a user. In a particular embodiment, the user interface is provided by a browser application 12a, 12b, . . . , 12n.

In general, the communication bridge 10 can be thought of as a switching system. But each end-user communication link 13 and each trading partner communication link 15 can follow unique data communication protocols. The communication bridge 10 also handles the conversion of the protocols through a protocol translator 17. The communication bridge 10 can also include a data store 19. A particular embodiment of the communication bridge 10 is NaviNet, commercially available from NaviMedix, Inc. of Boston, Mass.

There can be a high degree of variability in screen and workflow presentation. Depending on how the end-user interacts with the system, he or she could be presented with standard screens or workflows, custom screens or workflows or a hybrid combination of standard and custom screens and workflows. The process can also end with standard, custom or hybrid screens and workflows.

This ability to mass customize the interactions between trading partners also enables the system to support a "multiple trading partner" solution. Thus, end-users can use the same application or process to interact with their different trading partners, regardless of whether the trading partner is a customer of the system. It should be noted that the proprietary business rules of the supported trading partner customers are applied during the process. Even non-supported trading partners, however, can have their business rules applied on a limited basis.

In addition, the system supports partial entry of transactions. Transactions can be saved to the communication bridge database 19, regardless of the transaction's state of completion. This action does not submit the transaction for actual processing, but rather persists the transaction to be completed later, or to be reviewed and completed by another staff member. This capability enables end-users to incorporate the system into their routine workflow, which can be highly interrupt-driven.

Figure 3:
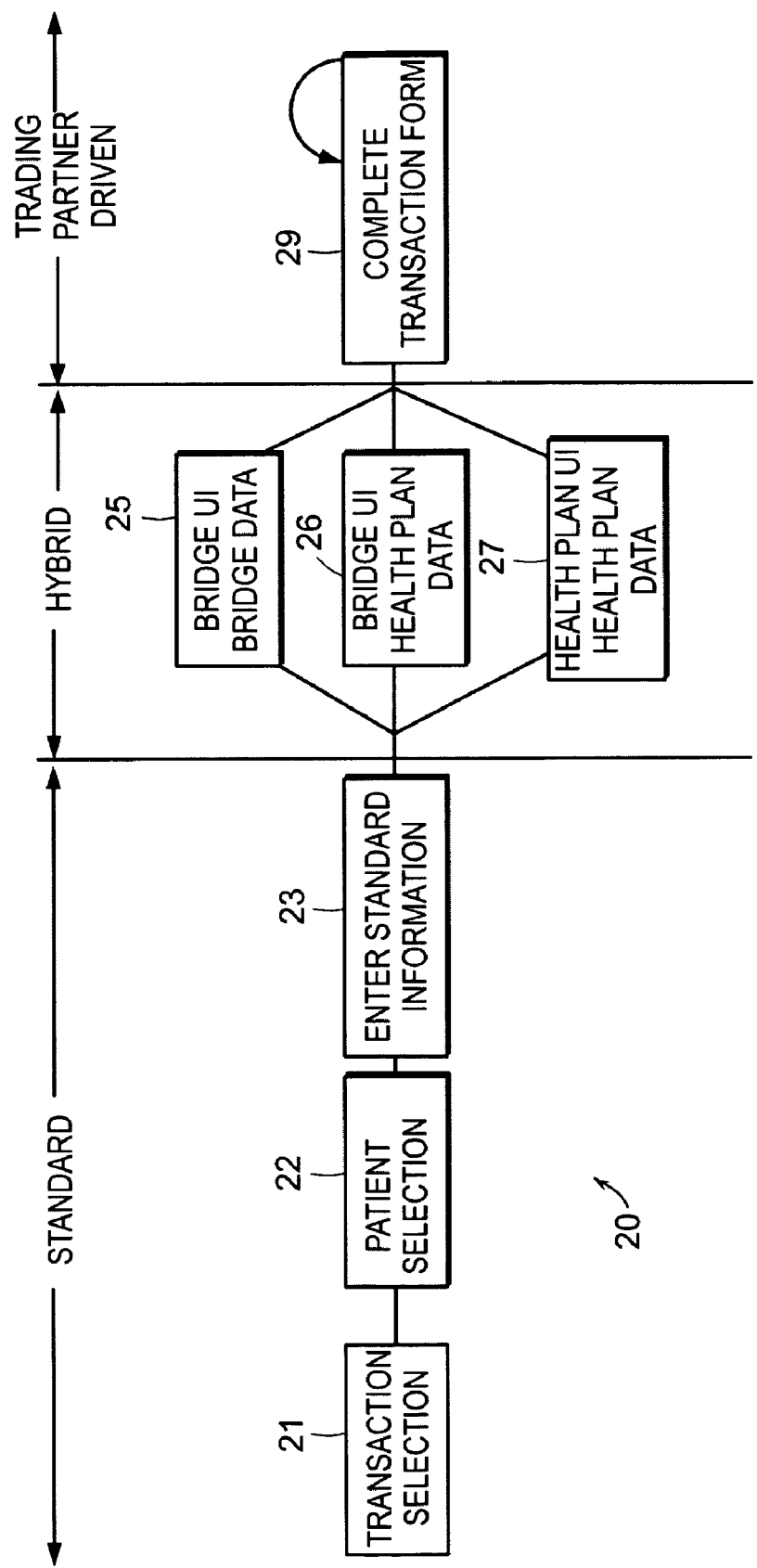
FIG. 3 is a process flow diagram of a referral transaction between an end-user in a provider office and a health plan trading partner.

FIG. 3 is a process flow diagram of a referral transaction between an end-user in a provider office and a health plan trading partner. Although described with regard to a particular set of interactions, this same process is applicable for other interactions between other trading partners.

The process flow 20 includes typical steps for initiating a referral transaction. At step 21, a member of a provider's office staff using the user interface 11 selects a transaction to start the referral. At step 22, the staff member selects a patient to be referred. At step 23, the staff member enters standard information, such as a referral type.

Once a transaction has been initiated, the next series of screens and workflow can vary based on user interaction with the system. One option, shown as step 25, is for the system to use the system's user interface to present and collect data entered by the office staff. A second option, shown at step 26, is for the system to use the system's user interface to present and collect health plan data. This option requires the most "cooperation" or interaction between the health plan's legacy transaction system and the system. A third option, shown at step 27, is for the system to present data that is stored in the health plan's repository using a health plan controlled interface. The repository can be a legacy repository or one created specifically for managing transactions between the trading partner and third parties, or any other appropriate data store.

The ability to tailor the presentation of information and screen flow to collect information enables trading partners to mass customize the transaction and retain their proprietary business rules, which give them a competitive advantage. At step 29, the trading partner customer continues to drive how data is presented to the end-user and how workflow is impacted by the end-user's interactions with the system.

Figure 4:
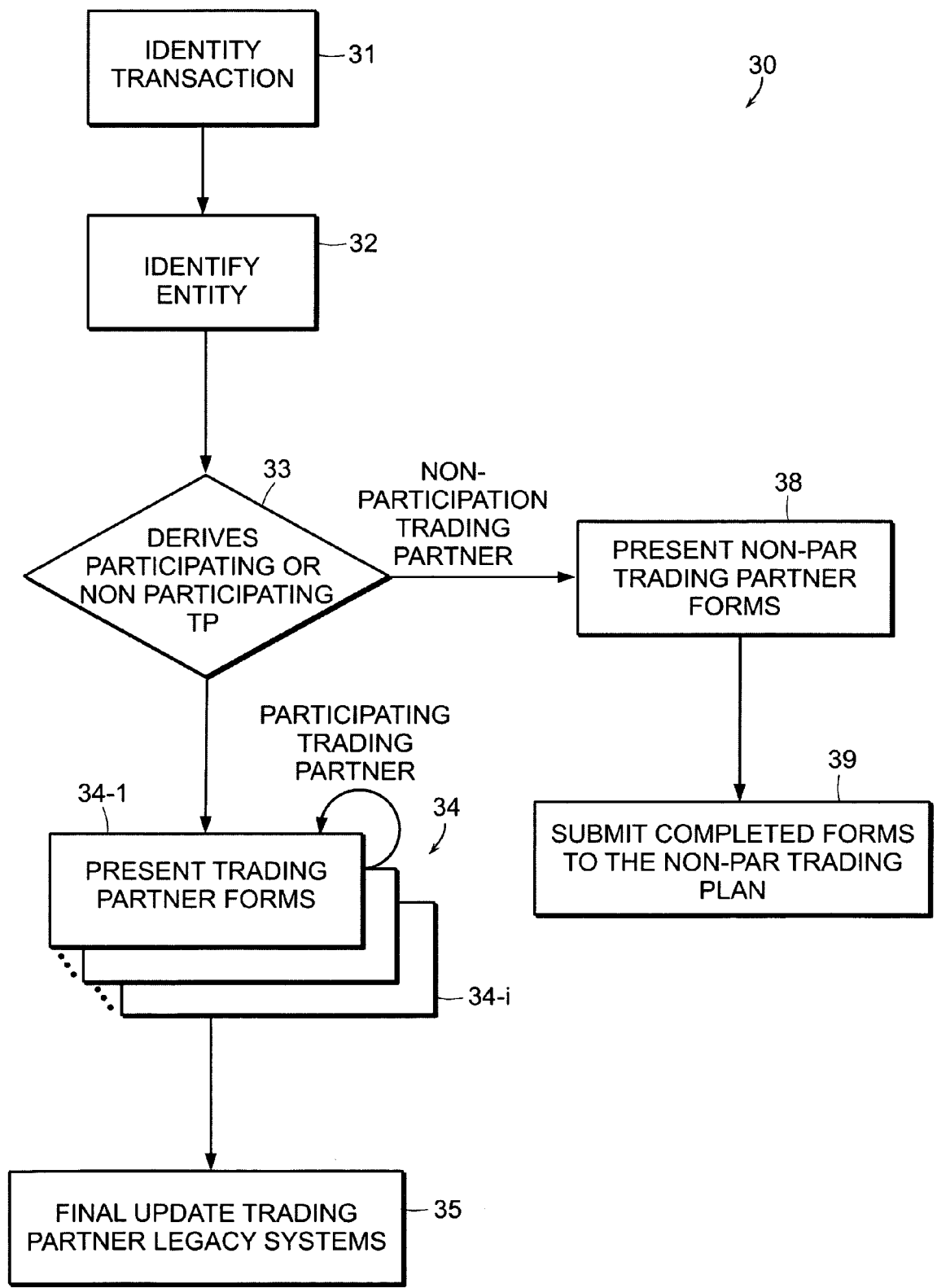
FIG. 4 is a workflow diagram for an end-user selecting transactions from multiple trading partners.

FIG. 4 is a workflow diagram for an end-user selecting transactions from multiple trading partners. At step 31, the user identifies the transaction by making a selection. At step 32, the user identifies an entity via an entity search form. At step 33, the system derives the trading partner from the entity selection and determines whether the trading partner is a participating trading partner or a non-participating trading partner.

If the trading partner is an on-system participant, processing continues to step 34. At step 34, trading partner forms are presented to the user. A series of different forms is dynamically presented, at steps 34-1, . . . , 34-i, based on data entered by the user. Subsequent business rules are triggered, causing subsequent forms to be presented to the user, until the selected transaction is completed. Upon completion of the transaction, at step 34-i, processing continues to step 35, where the back-end transaction system is updated, either through a direct or store-and-forward connection to the transaction system 6 (FIG. 2).

If the trading partner is not a participant (i.e., an off-system trading partner 6P (FIG. 2)), at step 33, processing continues to step 38. At step 38, the forms for the non-participating trading partner are presented to the user. This is a simple presentation of branded forms, typically an electronic or virtual version of the paper form. Although some business rules may be applied by the system, that application is minimal. Then, at step 39, the completed forms are forwarded to the trading partner. The forms can be electronically faxed, or printed and manually faxed or mailed.

This consistent look-and-feel and sequence of steps make it easier for the end-user to work with multiple trading partners, all of which have different business rules and processes for submitting transactions to them. At the same time, when appropriate within the workflow, the end-user can be presented custom, trading partner-specific forms, which can include embedded business rules and logic, as well as branding. As such, the system presents end-users with a single point of access to multiple trading partners (TP) and can support partner specific workflow within a common workflow framework.

FIG. 5 is a user display for viewing a transaction log. The system's log functionality presents a listing of transactions 42 with a standard look-and-feel for each transaction type submitted to different trading partners. For example, in the current healthcare embodiment there are logs that list referrals and authorizations, and claims for healthcare treatment submitted by staff within a physician/provider office to a payer. The format of the logs is the same for all payers. From the log view the user can: select a referral from the log 42 to view more detail or complete the transaction; search for a referral using a quick search interface 44a, a patient search interface 44b, or a full search interface 44c; or create a new referral or authorization using a creation interface 46.

Because each patient is associated with a payer, the system can derive the transaction's trading partner from the patient record. Within the common workflow framework, the system can display proprietary trading partner forms, retaining their look-and-feel, supporting their unique business processes and providing branding opportunities. To view transaction detail, the end-user selects the patient's referral/authorization (or claim) entry 42a, 42b in the log. The system renders the forms by clicking associated document icons 43a, 43b used to display and/or collect information for that transaction and payer trading partner. If the transaction is completed, the forms are typically displayed in read-only format. Otherwise, the end-user may edit the form to complete the transaction and submit to the trading partner.

The system can automatically send the transaction in real-time to participating trading partners, updating their back-end systems. The actual timing of these updates depends on the integration approach selected by the trading partner customer. Further details on back-end integration are described below. The functionality provided for participating trading partners is more robust and includes online (vs. fax) transmission, the application of the trading partner's unique business rules, which provide them with a competitive advantage, and interactive communication between the participating trading partner(s) and end-user. In the case of non-participating trading partners, the system delivers the information for each transaction in an out-of-band manner (e.g., electronically faxed from the server, or printed and then faxed or mailed) by the end-user to the non-participating trading partner.

Alternatively the end-user may conduct a transaction based on the trading partner. This entry point to the application is one of the places where trading partners' look-and-feel can be presented through the placement of logos and other brand marks, and links to the trading partners' corporate Web sites.

Figure 6:
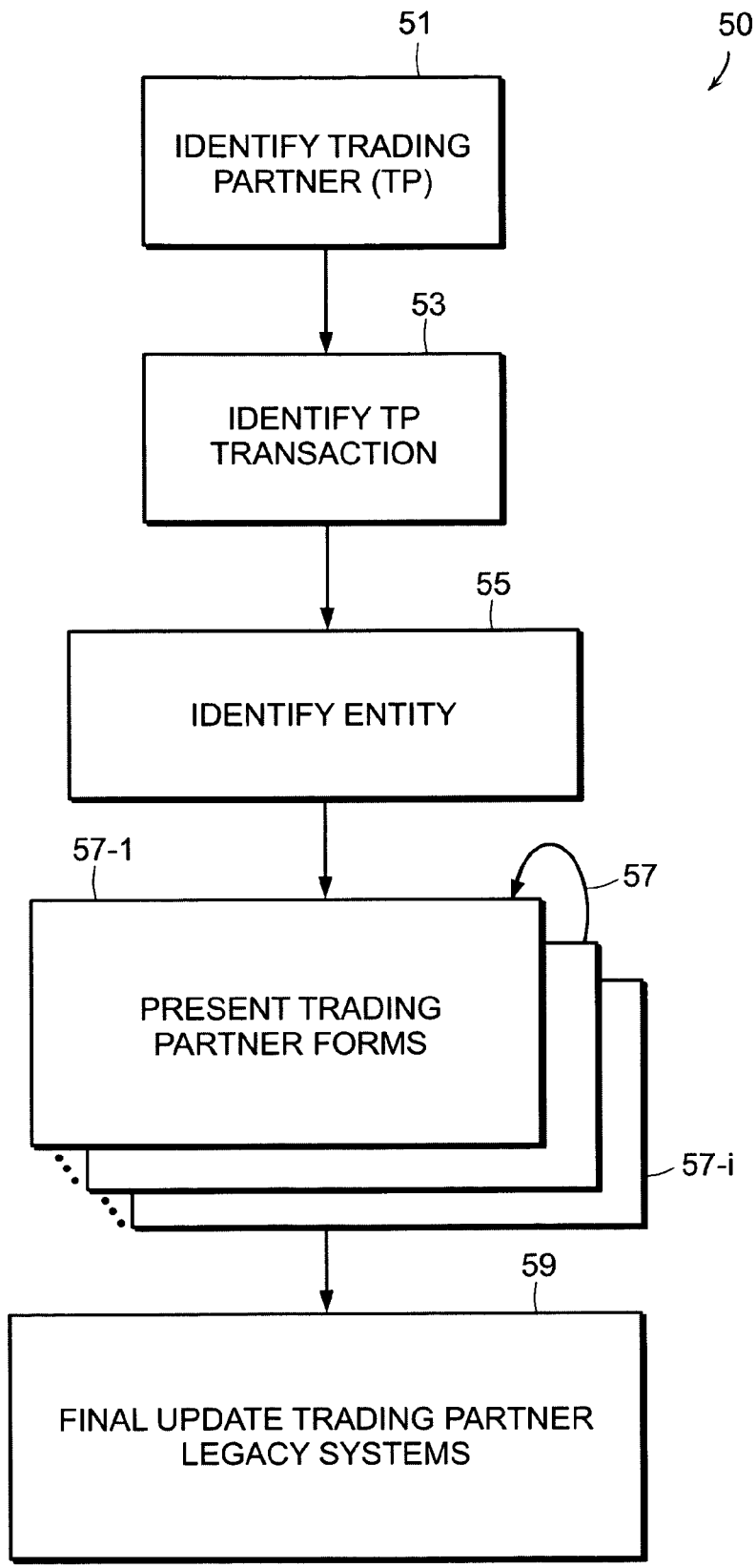
FIG. 6 is a workflow diagram for an end-user selecting transactions from a single trading partner.

FIG. 6 is a workflow diagram for an end-user selecting transactions from a single trading partner. This figure shows a trading partner-specific mode, whereby the end-user indicates the trading partner first before selecting among the transactions deployed by the trading partner. This workflow is significantly influenced by the trading partner and offers greater branding opportunities, including delivery of trading partner content outside the realm of the transactions down to the end-user.

At step 51, the workflow 50 begins by soliciting the user to identify a trading partner. The user then, at step 53, identifies a trading partner transaction. At step 55, the user identifies an entity using common workflow elements with a standard presentation of custom content.

At step 57, the system presents the user with the trading partner's forms. In particular, the user is dynamically presented with different forms, at steps 57-1, . . . , 57-i, based on data entered. That data can trigger subsequent business rules, which cause subsequent forms to be presented until the transaction is completed. Once the transaction is completed, at step 57-i, the back-end transaction system is updated at step 59, either through a direct or a store-and-forward connection.

Figure 7:
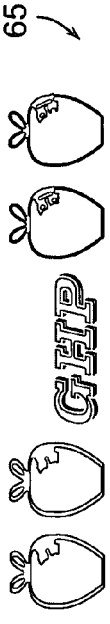
FIG. 7 is a user display for viewing a trading partner's home base.

FIG. 7 is a user display for viewing a trading partner's home base. The trading partner determines which transactions it deploys to end-users. The end-user selects a trading partner (e.g., health plan), which launches its home base 60. The end-user selects a transaction such as claim status inquiry or referral/authorization submission from menu buttons 62.

The system presents any combination of standard, proprietary and hybrid (a combination of standard and proprietary) forms to complete the transaction. The end-user typically selects an entity (the subject of the transaction), and, depending on the transaction, other entities such as referred to providers (for referrals) or billing providers (for claims). The system presents any combination of standard, proprietary and hybrid (a combination of standard and proprietary) forms to complete the transaction. As shown, the home base carries a branding identifier 65 to identify the particular trading partner to the user.

Common workflow elements, such as entity patient searching, can be presented with standardized content in a standard format to improve ease-of-use and provide the ability to navigate through the application, even though many of the forms are specific and unique to the trading partner and the workflow mirrors their specific unique business processes. Hybrid screens feature standardized presentation of custom content. Examples of this include search results—when an inquiry transaction is completed, search criteria along with custom content and trading partner data matching the search criteria are returned to the user.

FIG. 8 is a user display for viewing a patient search action. In the screen shot 70, the search criteria are custom for each payer based on what data elements are required to efficiently execute a search in their databases. There is typically overlap in search criteria data elements 72 among trading partners and the format of the screen is also consistent across trading partners. The results 74 (specifically the data within the columns) are also custom for each payer enabling them to provide as much or as limited information required by proposed Federal privacy regulations. Also shown is a branding identifier 75.

Proprietary trading partner forms dynamically render at the time of the transaction request with custom content and custom presentation. This is an iterative process; additional subsequent forms can be presented based on data entered on initial forms, business rules triggered; and the trading partner's business processes required to complete the transaction.

The system can automatically send the transaction in real-time to participating trading partner servers 160, providing access to the rules and where the connection could be either direct or store-and-forward. The actual timing of these updates is dependent upon the integration approach taken by the trading partner. Further details of back-end integration are described below.

Figure 9:
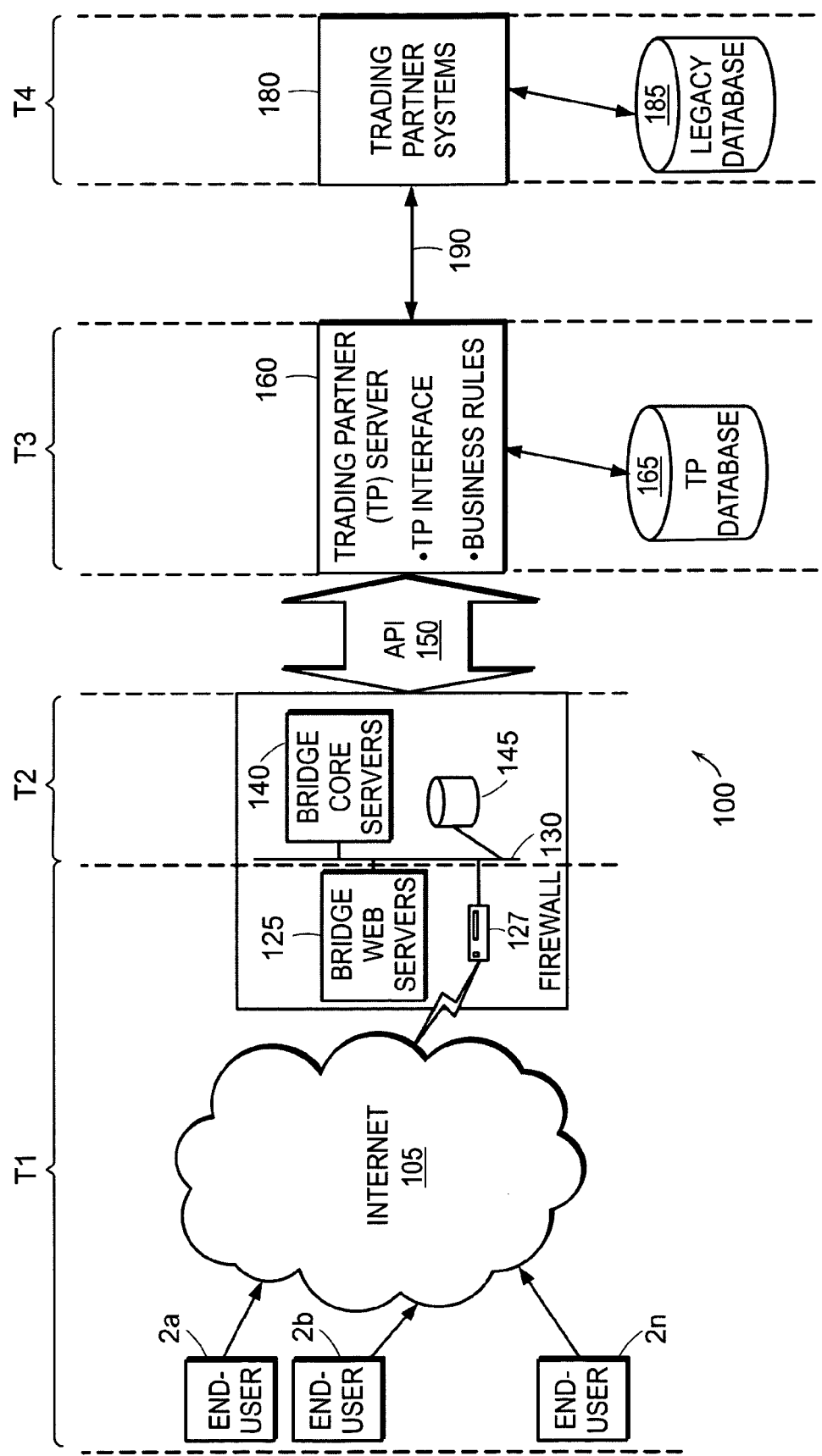
FIG. 9 is a schematic block diagram of the system's high-level architecture.

FIG. 9 is a schematic block diagram of the system's high-level architecture. A simple, browser-based interface hides the complexity of the system's technology from the end-users 2. It also minimizes the hardware and software needs at the end-user location. Trading partners realize the technology's benefits because the architecture leverages the trading partners' legacy systems and enables quick changes to their proprietary business rules and processes. The architecture 100 can be broken down into the following tiers: an end-user tier T1, core server tier T1, trading partner server tier T3, and a trading partner transaction system tier T4.

The end-user tier T1 is a presentation layer. Each end-user system 2a, 2b, . . . , 2n includes a device and software to access the core server tier T2. In a particular embodiment, the end-users interface with the core server tier T2 via the Internet 105. A device, such as a desktop or portable computer, or a handheld device, having Internet access and Internet browser software can be used for the end-user systems 2. The end-user systems 2 can represent a single-user organization, multiple-user organization (i.e., a group), or even groups of groups.

One or more web servers 125 connect the core server tier T2 with the Internet 105. The web servers 125 and the core server can be located on a network 130. As shown, a firewall 127 can be employed to control access to the network 130. The core server 140 drives everything that happens at the end-user location, e.g., login, storing and retrieving information related to the transaction or transaction entity, routing transactions to the appropriate trading partner, etc. As shown, the core server 140 can access a data store 145.

The partner server tier T3 includes a partner server 160 manages the trading partner's specific forms 162, business rules 164 and supporting data, and processing requests from the core server 140 as required. The partner server 160 stores the rules and possible database updates in a partner database 165.

As shown, the core servers 140 send and receive messages to and from the partner servers 160 using a communication link 150. In particular, the partner servers 160 exchange messages with the core servers 140 using an Application Programming Interface (API) 150. The API 150 can be implemented on a direct-connect communication link or a packet-switched communication link, such as an Internet connection. In either case, the use of an API makes the partner server 160 essentially invisible to the core server 140 and hidden behind the API 150.

The transaction system 180 is the legacy transaction system(s) used by the trading partner to conduct business. A legacy database 185 is maintained by the transaction system 180 to store information needed and maintained by the trading partner. The legacy database 185 can be maintained by the transaction system 180 alone or shared with the partner server 160.

The partner server 160 can reside at the same physical site as the core server 140, or at the same physical site as the transaction systems 180. In fact, the partner server 160 could be the same physical machine as the transaction system 180. Any suitable technology can be used for the communication link 190 between each trading partner server 160 and its corresponding transaction system 180.

A workflow is a serial exchange of Extensible Markup Language (XML) messages via transactions that are typically triggered by an end-user. For example, one trading partner might have several functions that display themselves to the end-user as buttons on the browser screen. These functions might be used to initiate an inquiry for information or to submit a transaction. Other trading partner services might offer only one or two functions. Because of the architecture 100, trading partners can deploy a unique set of transactions to their end-users. End-users conducting business with multiple trading partners can use the system as a single point of access to these trading partners and the different transaction sets trading partners elected to deploy.

Workflows determine the screens, and their content, and when the screens are displayed. In general, the system's approach to workflows is as follows:

The end-user initiates the workflow from within the system application.

The initial communication is from the core server 140 to the trading partner server 160, in the form of an XML request.

The trading partner server 160 sends an XML response back to the core server 140 that either answers the request or asks for more information.

If the partner server 160 requests more information, the communication bridge 10 presents the request to the end-user 2, who can then fill out fields or select entity names from a list. Upon completion, the communication bridge 10 then returns this information as an XML response to the partner server 160.

The workflow continues until the partner server 160 is satisfied that it has received the requested information or action.

Figure 10:
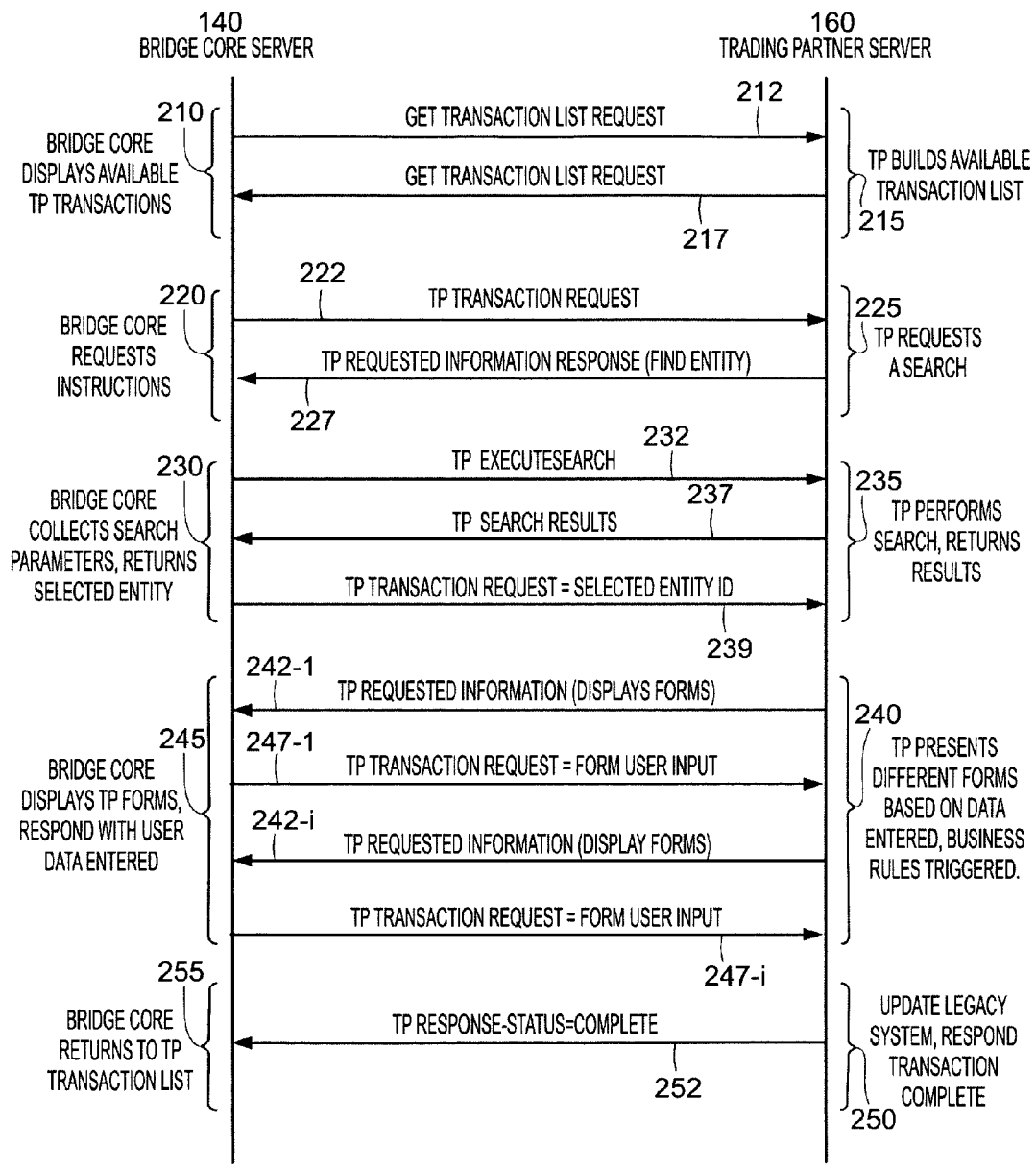
FIG. 10 is a trading partner object interaction diagram for the single transaction workflow of FIG. 6.

FIG. 10 is a trading partner object interaction diagram for the single trading partner workflow of FIG. 6. This figure illustrates how a transaction initiated by an end-user travels through the system to the partner server and legacy systems and back to complete the transaction. Shown is the conversational nature of the API 150 (FIG. 7), which enables the system to dynamically render forms to collect additional information to complete a transaction.

In particular, the system's ability to continue to send requests and receive responses between the end-user 2 and the partner server 160, enables the dynamic rendering of new forms (standard, custom to the trading partner and hybrid) until the information required to complete the transaction has been collected. This capability enables trading partners to update or modify their transactions to address new business requirements with minimal to no impact on the system core.

The end-user logs into the system application and selects a trading partner with which to interact. For example, the core server 140 can send inquiry requests for information, or submit transactions that might require a series of inquiry requests and responses. As shown, available trading partner transactions are displayed to the user by the core server 140 at step 210. This is initiated by a get transaction list request 212 sent from the core server 140 to the partner server 160. This in turns identifies the partner server 160 with which the core server 140 interacts. The partner server 160 builds a list of available transactions at step 215 and sends the list 217 to the core server 140, which is then delivered for display to the end-user. As example display is shown is FIG. 7. The end-user selects a transaction 220 and a transaction request 222 is submitted to the partner server 160. The partner server requests a search 225 by returning a requested information response 227, which the core server delivers for display as a form to collect search parameters (e.g., to find the transaction entity). The end-user specifies the search criteria (which can be defined by the partner server 160) 230, triggering an execute search message 232 to cause a search 235 on the partner server 160. The partner server 160 returns the search results in a search result message 237. The results are in turn returned by the core server 140 to the end-user. The end-user selects an entity from the search results and the selected entity identifier is returned to the core server 160 in a transaction request message 239.

The forms that the system delivers to collect search criteria and present search results are hybrid forms in that the format for collecting and presenting results is consistent across trading partners to improve ease-of-use. However, the content displayed, including the search criteria used for the entity searches, is specific to the trading partner. An example of a search form is shown in FIG. 8.

The partner server 160 begins the process of presenting different forms, at step 240, based on data entered by the end-user in these requested forms and business rules triggers. The partner server 160 sends a requested information message 242-1 to the core server 140 to display a form for user input (at step 245). The user input to the form is returned to the partner server 160 by a transaction request message 247-1. This is an iterative process through i sequences of messages (242-1:247-1, . . . , 242-i:247-i). This process enables trading partners to insert new business rules easily or collect additional information based on an end-user response to certain questions without disrupting the workflow of the end-user.

FIG. 11 is a user view of a subsequent referral form. In the case of a referral, the system can identify, based on trading partner-specific business rules, that a patient may be a candidate for a disease management program because, for example, the referral is for treatment of congestive heart failure. The system can then present additional screens to collect additional medical history information to justify the referral request. As shown, the subsequent referral form 80 is displayed in response to user input data. The user is asked to respond to certain specific questions 82. The form 80 includes partner-specific branding 85.

Returning to FIG. 10, the partner server 160 is in control of determining that the transaction status is complete at step 250, and all information is collected through the iterative process of presenting forms. Upon completion, the partner server 160 sends a response message indicating a completion status code 252. In the referral request example, the final response is a referral status and authorization number.

FIG. 12 is a user view of an authorization referral form. As shown, the form 90 displays a referral status 92, which in this case is approved, and an authorization number 94. Also, the form 90 includes partner-specific branding 95.

Returning to FIG. 10, the partner server 160 updates the transaction legacy system 180. The timing of the update varies by trading partner and depends heavily on whether a store-and-forward approach or a direct connection strategy is pursued.

Figure 13:
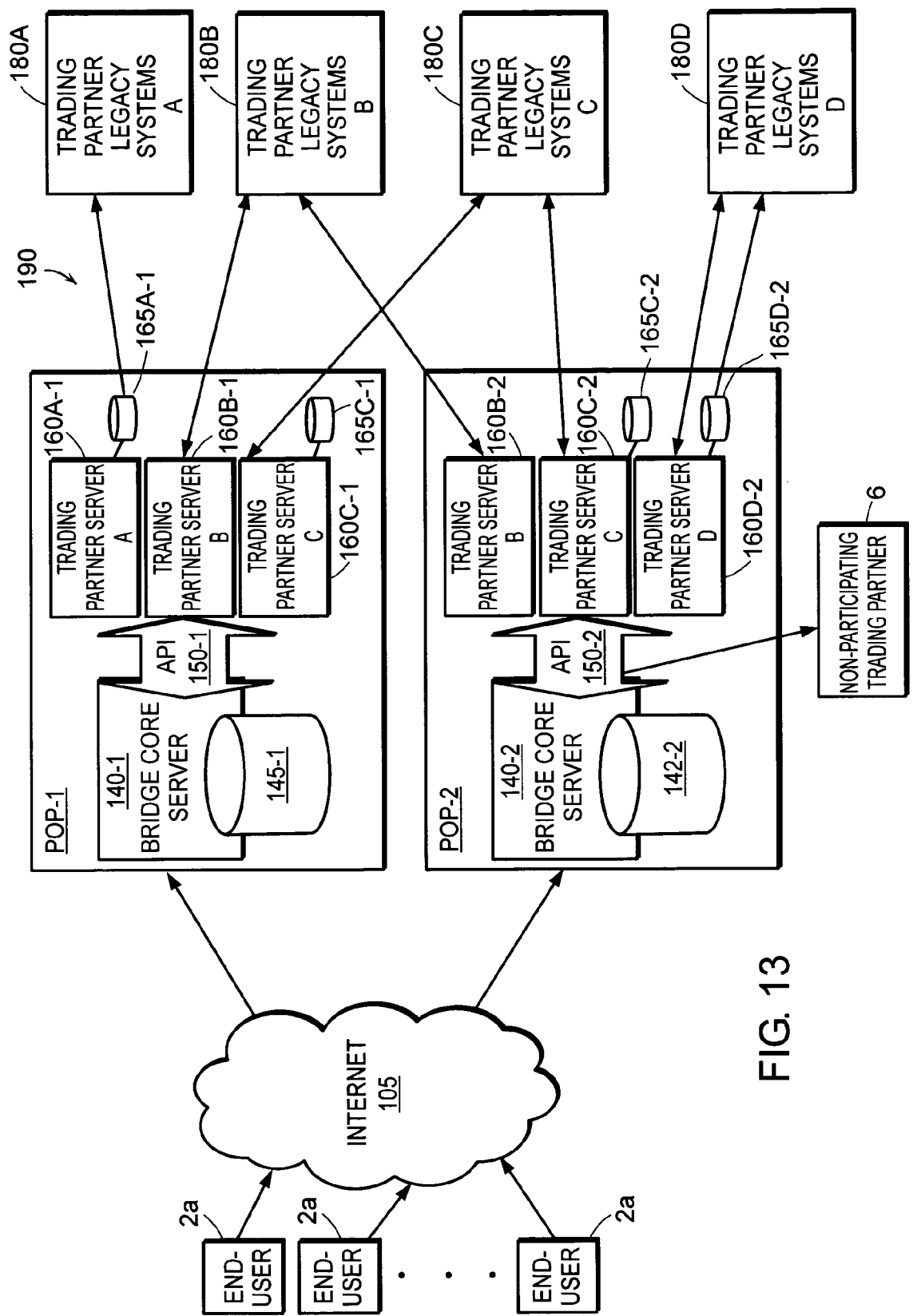
FIG. 13 is a schematic block diagram of back-end integration strategies available to trading partners.

FIG. 13 is a schematic block diagram of back-end integration strategies available to trading partners. Back-end connectivity to the trading partners' legacy systems 180A, 180B, 180C, 180D is integral to the system. As shown, the system can be deployed across multiple core server installations 140-1, 140-2 or Points-of-Presence (POP) POP 1, . . . , POP 2, which in turn can be connected to multiple partner servers 160A-1, 160B-1, 160C-1, 160B-2, 160C-2, 160D-2. The core server databases 145-1, 145-2 store session, configuration, and workflow information related to the end-users, plus data updated automatically as the associated core server 140 and partner servers 160 work together to support the end-users 2.

The methods of back-end integration from these partner-specific computing entities to the trading partner's Information Technology (IT) shop covers a broad spectrum. On one end of this spectrum, there is a "pure" direct connect. In this scenario, it is possible for the trading partner's legacy system to directly implement the API and carry all workflow logic, business logic, data, and look-and-feel content.

Closely related to the "pure" direct connect model is another model where there is a partner server 160B-1, 160B-2 that implements the API. The partner server 160B-1, 160B-2 then translates API messages to direct calls into the legacy system 180B, and vice versa. Consequently, the legacy system 180B can play an integral role in the run-time execution of the system, because all data and logic resides there.

At the other end of the spectrum, the partner server 160A acts completely on behalf of the transaction system 180A in store-and-forward configuration. It is the partner server 160A that houses the workflow logic, business logic, data, and look-and-feel content in an associated database 165A-1. The legacy system 180A is completely uninvolved in the execution of the system, other than to serve as a source from which data (and potentially logic or other content) is refreshed on a regular but not real-time basis. Unlike the previously described models, this model typically requires that data be synchronized between the partner server 160A and the trading partner's legacy system 180A. This often takes place as regularly scheduled batch jobs.

In between these two extremes, there are many possible combinations of distributing workflow logic, business logic, data, and other content. For example, data for a single transaction may be split between the partner server 160C-1, 160C-2, 160D-2 and the legacy system 180C, 180D. Some of the data (e.g., infrequently changing look-up tables) necessary for a transaction may be cached on the partner database 165C-1, 165C-2, 165D-2 to alleviate computing load on the legacy system 180C, 180D and to optimize performance on the back-end. This data can be batch loaded from the partner database 165D-2 to the legacy system 180D. Other data (e.g., data changed frequently by the legacy system 180C, 180D itself) used in that exact same transaction may still be referenced directly in the legacy system 180C, 180D. Furthermore, because the trading partner-specific integration platform does not dictate a specific data model or data dictionary, those elements are free to mirror the trading partner's legacy systems' data model and data dictionary. The system's flexible architecture also makes the decision to pursue one integration strategy over another, or even combine strategies, an implementation issue—not a technology issue.

Figure 14:
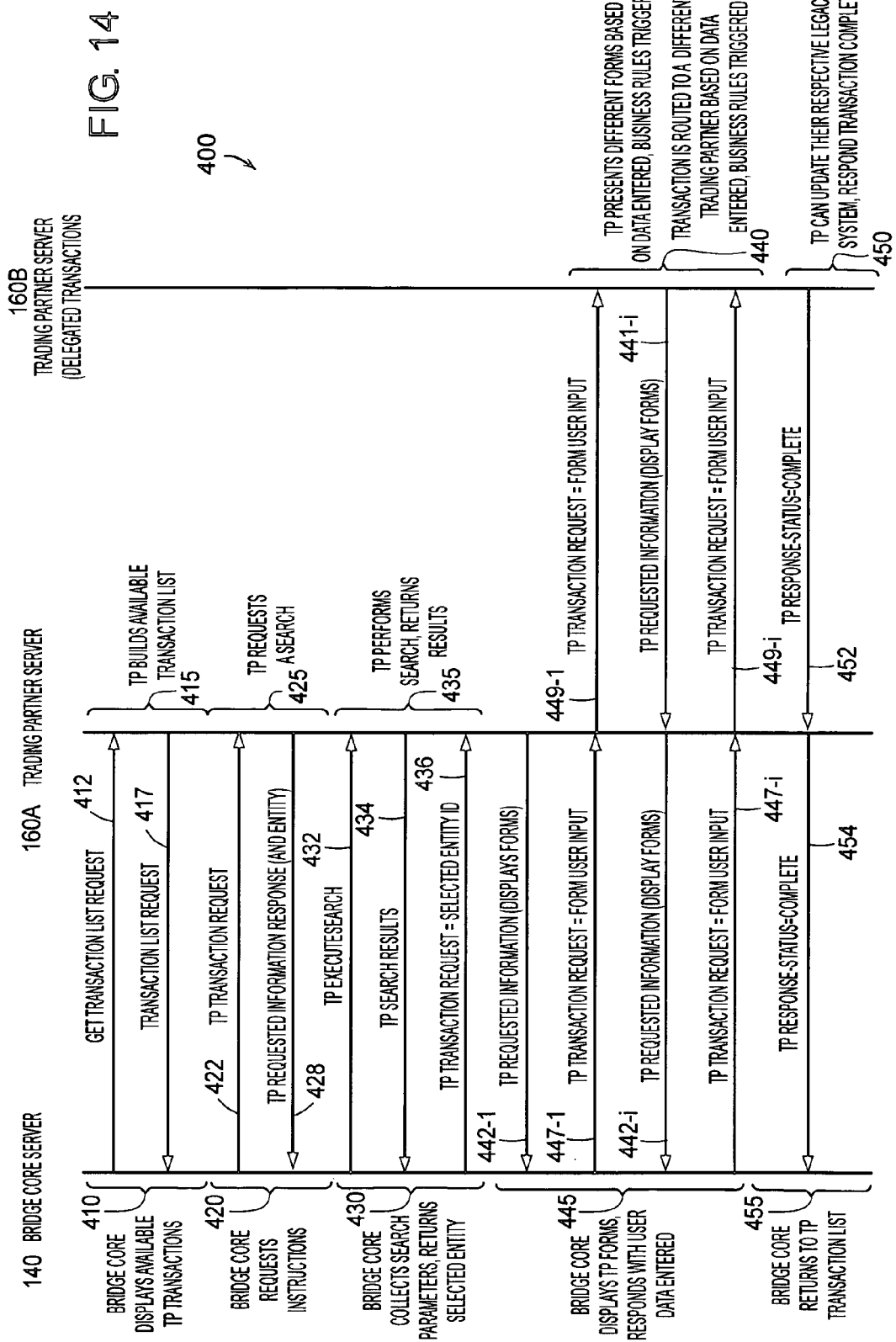
FIG. 14 is an object integration diagram for delegated transaction processing.

FIG. 14 is an object integration diagram for delegated transaction processing. As shown, a transaction is sent through to two trading partners, one of which has delegated certain functions to the other trading partner in mid-process. The system's ability to route transactions to different partner servers 160 (FIG. 13) based on certain business conditions being met, supports complex business relationships between trading partners. In particular, this ability to route requests and responses enables the system to work with trading partners that have delegated certain business functions to other trading partners with which either they or their end-users have contracted.

This example transaction 400 starts with an end-user identifying a trading partner, causing a "get transaction list" request 412. The corresponding partner server 160A builds an available transaction list at step 415 and returns a transaction list message 417. The core server 140 then displays the available transactions to the user at step 410.

The transaction continues with a transaction request 422 from the core server 140 to request instructions at step 420. A requested information response 428 is sent from the partner server 160A to request a search for an entity at step 425.

The core server 140 then collects search parameters from the user and sends an "execute search" message 432 to the partner server 160A. The partner server 160A executes a search for an entity at step 435 and returns a search results message 434. The results are displayed by the core server 140. The end-user then selects the entity and the core server 140 sends a transaction request 436 for the selected entity.

The core server 140 and the trading partner server 160A begin, at step 440, an i-step iterative discussion, displaying forms to collect information 445 and returning user input to the partner server 160A. This involves a requested information message 442-1 from the partner server 160A to the core server 140 and a transaction request message 447-1 having the user input data from the form returned from the core server 140 to the partner server 160A.

In mid-process, the transaction can be routed 449-1 to another partner server 160B if the condition for a delegated function or process is met. The delegated partner server 160B can continue to send display form messages 441-$i$ to and receive collect information messages 447-$i$ form the end-users through the original partner server 160A (442-$i$, 449-$i$) or directly to core server 140, until the transaction is complete.

The completion of the transaction is determined by the delegated partner server 160B at step 450. In response to the completion of the transaction, a response message 452 indicating the completion status is sent from the delegated partner server 160B to the original partner server 160A, which forwards the message 454 to the core server 140, or directly to the core server 140 itself. In response, the core server 140 displays the transaction list at step 455.

Each server 160A, 160B can update its respective back-end transaction legacy system 180A, 180B.

Returning to FIGS. 9 and 13, partner-side applications use an API 150 to communicate with the communication bridge 10. As briefly described above, the API 150 exchanges XML messages between the core server 140 and one or more partner servers 160. The core server 140 and partner server 160 can run on nearly any computer and operating system that can read and return XML strings. The use of XML provides flexibility to the API 150.

In particular, the communication bridge 10, includes an XML document file, an Extensible Stylesheet Language (XSL) stylesheet file, an XML parser, and a Document Type Definition (DTD) file. The XML document is a hierarchical structure of XML strings shipped to the web server 120. The XSL stylesheet is sent to the web server 120 with the XML document, and specifies how the XML document is to be transformed into HyperText Markup Language (HTML) that can be displayed on the user's browser as a virtual form. The parser takes the XML and creates and manipulates an in-memory tree structure of all elements in the XML document. Alternatively, the parser can create an in-memory tree structure and, from it, generate an XML document. This allows the communication bridge 10 to read and write XML strings. The DTD file allows the communication bridge 10 to verify that the XML it receives from the client partner server 160 is valid. In particular, the DTD specifies which XML elements are legitimate parents and children, which attributes are allowed and required, etc. The DTD, therefore, is basically the API 150.

On the partner side of the API 150, the partner system includes a partner server 160 executing an application program that works with an XML document and a DTD file. The application also interacts with an XML parser.

As previously described, a workflow is the serial exchange of XML messages. The general flow of the XML messages is first a request, and then a response, followed by more of the same until the partner server 160 has achieved its objective. In a particular embodiment, there are a plurality of parent messages containing XML elements that may, in turn, contain others, and so on, so that an entire tree of database-type information can be communicated between the core server 140 and the partner server 160.

Figure 15:
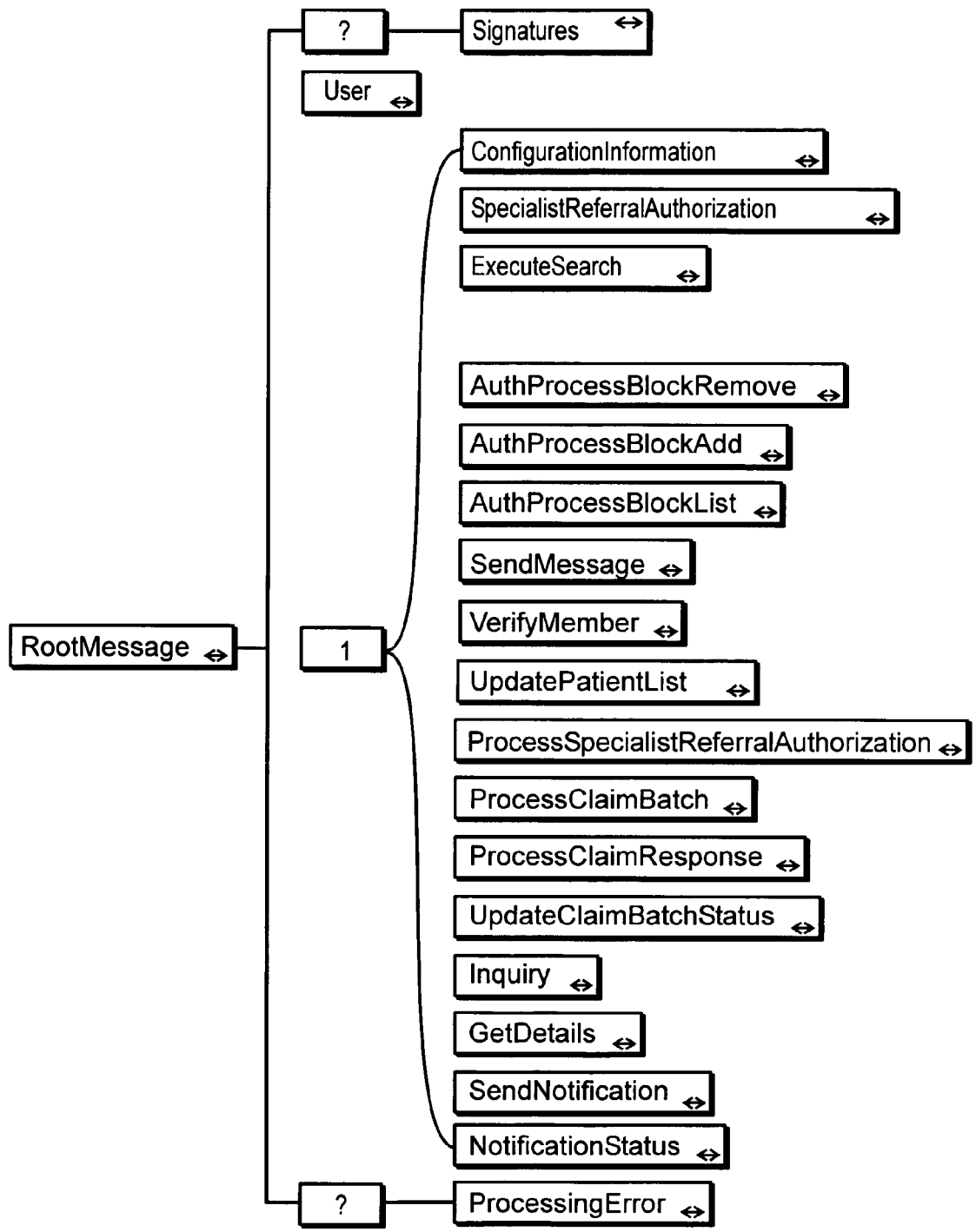
FIG. 15 is a schematic diagram of an XML root message in accordance with a particular embodiment.

FIG. 15 is a schematic diagram of an XML root message in accordance with a particular embodiment. The parent messages are children of the root, which actually has 3 additional children: Signature, User, and ProcessingError. When the root message is exchanged, it includes User, and it may include Signature and ProcessingError. The root message may also include any one of the other parent messages.

RootMessage is the root of all the elements. As shown, it defines a plurality of elements, most of which are messages, which are the primary methods in the API 150. The following elements are components of RootMessage:

AuthProcessBlockAdd is a bridge-to-partner message that authorizes the addition of a block of form numbers for processing.

AuthProcessBlockList is a bridge-to-partner message that asks for a list of blocks of form numbers.

AuthProcessBlockRemove is a bridge-to-partner message that removes a block of form numbers from those available.

ConfigurationInformation is a message that requests configuration information from the partner server 160. This message from the core server 140 may not be used. Instead, if the core server 140 wants to know configuration information about the partner server 160, it can request it via the ConfigurationInformation method. That method can then return the XML string representing the information in a BridgeConfigurationInformation message rooted at RootMessage.

ExecuteSearch is a message that initiates a search.

GetDetails is a message that returns a generic detail record from the partner.

Inquiry is a bridge-to-partner message that initiates an inquiry to the client partner database. A trading partner might use this to provide the user with business processes that the bridge 10 does not directly support. For example, Inquiry can be used to let a user browse specific partner data.

NotificationStatus is a bridge-to-partner message that provides the status for a notification that is to be sent on behalf of a partner server 160.

ProcessClaimBatch is a bridge-to-partner message that starts sending a batch of claims to the partner server.

ProcessClaimResponse is a partner-to-bridge message that sends individual claims to the bridge 10, along with their status and any messages.

ProcessingError is a message that may be appended to a RootMessage to specify the type of "processingerror." The partner does not need to do anything with this message.

ProcessSpecialistReferralAuthorization is a partner-to-bridge message that provides the bridge 10 with the results of an asynchronous SpecialistReferralAuthorization request.

SendMessage is a message from the bridge 10 to a partner, or vice versa, to send special (internal to the bridge 10) email messages to an entity in the bridge application. For example, a trading partner could send a message to a bridge administrator to request more form numbers.

SendNotification is a partner-to-bridge message to send a notification, such as to fax a form or email the form via the Internet to an external recipient. For instance, a trading partner may want to fax a referral form to a specialist.

Signatures is an optional text field for verification of authority.

SpecialistReferralAuthorization is a bridge-to-partner workflow message that allows a trading partner to direct the processing for a referral to a specialist.

UpdateClaimBatchStatus is a partner-to-bridge message sent when the batch of claims is finished, reporting on details for the entire batch.

UpdatePatientList is a partner-to-bridge message in which the trading partner gives the bridge 10 a list of patients. This component may not be required in some implementations.

User identifies an entity, i.e., an office user, a partner server, or the core server 160, that initiated a message.

VerifyMember is a bridge-to-partner message used during referral processing to ask the trading partner if it recognizes the specified patient/PCP pair, and, further, whether the trading partner is willing to process a referral for this patient.

A DTD file defines a syntax for a set of allowable XML messages. An example DTD syntax for the messages of FIG. 15 is provided in Appendix A. The messages can be classified as either configuration messages, workflow messages, update messages, or command messages.

Workflow messages all follow the same format: a request to the trading partner and a response from the trading partner. The request and response sections use RequestedInformation to specify the trading partner information requested and the core server response. If the core server maintains a log of the new work flow transactions, then the response section can contain standard information that is maintained in the log. To generate a new workflow transaction message:

1. Define the new workflow transaction name and create a new API message. The message structure is essentially the same as existing workflow messages (SpecialistReferralAuthorization, for example).
2. Define all possible status values that the new transaction can have. One status value should always be INCOMPLETE, because this is how a partner server signals the core server to continue.
3. Define the standard transaction fields for the core server log, if any. Add these fields to the new transaction's response.
4. If the new work flow transaction can be asynchronous, then add an additional API message on the core server. The new message allows the trading partner server to update the status of an individual transaction on the core server. The update can occur at any time.
   a. If the workflow transaction message is MyWorkflow, then the core server API message is named ProcessMyWorkflowResponse.
   b. The new message structure is the same as existing asynchronous messages (ProcessSpecialistReferralAuthorizationResponse, for example).
   c. All status values defined in step 2 are available in the new request.
   d. All standard transaction fields defined in step 3 are part of the new request.

Configuration XML messages are sent by a partner server 160 to the core server 140. They describe some aspect of what the trading partner supports, such as which messages and tasks. In the particular embodiment shown, there is only one configuration message, ConfigurationInformation, which is not used in normal workflow request or response communication. Other embodiments may employ more configuration messages or may use configuration messages differently.

Workflow messages are initiated by the core server 140 and provide a mechanism for a trading partner to designate steps in a business process. The bridge-to-partner messages Inquiry, SpecialistReferralAuthorization, and ProcessClaim tell the trading partner that a particular task is to be executed. The trading partner responds with a request for information. Then, when it has that information, the trading partner makes another request. These steps continue until no more information is needed and the task is complete.

The Inquiry and SpecialistReferralAuthorization messages are generic requests used to initiate a series of messages and responses to return display data elements. Data is not saved on the communication bridge for an Inquiry (other than activity data that may be tracked for internal purposes), which is meant to let a user browse specific partner data. For a SpecialistReferralAuthorization message, however, an authorization is eventually received from the partner server 160, and its associated data is stored. a Data that is normally saved in the core server's database include well-defined fields that are generally applicable across all partners. Examples would be: patient name, patient identifier, Primary Care Provider (PCP) name, and specialist fields.

Update messages are sent by the partner server 160 to the core server 140 to update data and workflow information stored in the core server database. This may be done, for example, when a partner server 160 needs to review or process a task offline. When that review or processing completes, the partner server 160 sends the appropriate update message to the communication bridge. An example of an update message is ProcessSpecialistReferralAuthorization, which updates the workflow information for the SpecialistReferralAuthorization message.

The most basic type of a message is a simple command message, which tells the recipient to perform a particular action and to respond with a response. The ExecuteSearch message, for example, is sent to a trading partner to perform a search based on type and criteria specified in the ExecuteSearchRequest part of the message. The trading partner returns the results of the search in the appropriate ExecuteSearchResponse section. Most messages are command messages.

If one wanted to send messages to authorize a referral, for example, they would start at the root, RootMessage. The decision would then be to send a SpecialistReferralAuthorization message. From the DTD syntax, that message requires a SRARequest parameter, which in turn requires a UTC-TimeStamp parameter, and so on. As one continues, an increasing longer XML string would be created. An example XML string that requests a referral for a given patient and PCP is given in Appendix B.

In accordance with a particular embodiment, the partner server 160 can embed XML tags in the XML messages. A partner-data tag can be used to enclose partner-specific information and a partner-forms tag can be used to provide data particular to the display of information on the user's browser screen.

The partner-data tag is useful for allowing the partner server 160 to record state or contextual information. The core server 140 allows the partner-data tag to maintain any data desired in each XML message exchanged between the partner server 160 and the core server 140.

In using partner-form tags, a partner may have custom forms that it wants to use during a workflow. A particular form may be used in different ways, based upon the stage of the workflow. For instance, a partner may present the user with an editable form to collect data. Later in the workflow, the partner may present the same form containing the collected data in read-only fields. Conceptually, these are the same forms, but from an implementation perspective they are different.

The partner-forms tag has a defined format. That format includes a name, a specification of the type of the form to display, and agreed-upon form names. Partner forms can be cached in the bridge database 19, along with the well-defined fields of information.

Those of ordinary skill in the art should recognize that methods for implementing a system for dynamic information exchange may be embodied in a computer program product that includes a computer usable medium, such as computer storage readable medium or computer transmission readable medium. For example, such a computer storage medium can include a readable memory device, such as a solid state memory device, a hard drive device, a CD-ROM, a DVD-ROM, or a computer diskette, having computer-readable program code segments stored thereon. The computer usable medium can also include a communications or transmission medium, such as a bus or a communications link, either optical, wired, or wireless, having program code segments carried thereon as digital or analog data signals.

While the system has been particularly shown and described with references to particular embodiments thereof, it will be understood by those of ordinary skill in the art that various changes in form and details may be made therein without departing from the scope of the invention encompassed by the appended claims. For example, the methods of the invention can be applied to various environments, and are not limited to the environment described herein.

The invention claimed is:

1. A system for exchanging data between a user and a database, comprising:
    a user interface for interacting with the user, the user interface receiving input data from the user;
    a plurality of remote transaction systems, each remote transaction system associated with a health care trading partner, each remote transaction system independently managing a respective database, and each remote transaction system not directly connected to other remote transaction systems in the plurality; and
    a communication bridge in connection with the user interface and remote transaction systems, the communication bridge operable with disparate transaction systems in a manner using one query to support multiple transactions with different disparate transaction systems and including:
        a first interaction system using a first set of data formatted for communicating with the user interface and displaying a first form associated with a selected remote transaction system and a second form associated with a different remote transaction system; and
        a second interaction system for communicating with the selected remote transaction system using a second set of data formatted for communicating with the selected remote transaction system and its respective database, the communication bridge operating on the first and second sets of data and handling conversion between (a) the format of the first set of data communicating with the user interface and (b) the format of the second set of data communicating with the selected remote transaction system and its respective database.

2. The system of claim 1 wherein the user interface is a graphical user interface.

3. The system of claim 2 wherein the graphical user interface includes a browser.

4. The system of claim 1 wherein the databases are disparate.

5. The system of claim 1 wherein the selected remote transaction system includes processing logic responsive to the input data.

6. The system of claim 5 wherein the processing logic determines additional data to be input by the user.

7. The system of claim 1 further comprising a store of display forms, each display form soliciting input data from the user, the second form resulting from input data of the first form.

8. The system of claim 7 wherein a specific display form is communicated to the user interface in response to a business model of the selected remote transaction system.

9. The system of claim 8 wherein the specific display form is determined from input data.

10. The system of claim 1 wherein the first interaction system includes an Internet protocol.

11. The system of claim 1 wherein the second interaction system includes a messaging protocol.

12. The system of claim 1 wherein the communication bridge includes a third interaction system for communicating with a second selected remote transaction system.

13. The system of claim 1 wherein the user interface displays a transaction log, each entry in the transaction log associated with one of the remote transaction systems.

14. The system of claim 13 wherein for a selected entry in the transaction log, the system derives a trading partner associated with the transaction and displays a proprietary form associated with the trading partner.

15. The system of claim 14 wherein the remote transaction systems are health care trading partners and the user is a supplier of health care services.

16. The system of claim 1, wherein the first interaction system employs a HyperText Markup Language.

17. The system of claim 1, wherein the second interaction system employs an eXtensible Markup language.

18. A system for exchanging data between a user and a database, comprising:
- a plurality of end user systems, each end user system having a user interface for presenting virtual forms for data collection and data display;
- a plurality of remote transaction systems, each transaction system associated with a health care trading partner, each remote transaction system having data stored in a database and a set of rules for using a plurality of forms to collect data for the database, and each remote transaction system not directly connected to other remote transaction systems in the plurality; and
- a communication bridge in communication with the end user systems and the transaction systems, the communication bridge operable with disparate transaction systems in a manner using one query to support multiple transactions with different disparate transaction systems and including:
  - a first data communication server having a first interaction system using a first set of data formatted for communicating with the remote transaction systems and their respective databases, and displaying a first form associated with a selected remote transaction system and a second form associated with a different remote transaction system;
  - a second data communication server having a second interaction system for communicating with the end user system using a second set of data formatted for communicating with the end user system; and
  - a network structure connecting the first server with the second server, the communication bridge operating on the first and second sets of data and handling conversion between (a) the format of the first set of data for communicating with the remote transaction systems and their respective databases and (b) the format of the second set of data communicating with the end user systems.

19. The system of claim 18 wherein a virtual form is presented to the user under command of the set of rules of a specific remote transaction system.

20. The system of claim 19 wherein input data collected from the user by the virtual form is stored in the database of the specific remote transaction system.

21. The system of claim 19 wherein the communication bridge derives the specific remote transaction system from input data collected from the user by a previously presented virtual form.

22. The system of claim 18 wherein the second server is an Internet web server.

23. The system of claim 18 wherein the first server includes a conversational interface to the remote transaction systems.

24. The system of claim 18 wherein the communication bridge exchanges of information between one end user system and many remote transaction systems.

25. The system of claim 24 wherein the one-to-many relationship completes a single transaction for the end user system.

26. The system of claim 18 wherein the remote transaction system includes a legacy transaction system.

27. The system of claim 26 wherein the remote transaction system further includes a transaction server in communication with the first server.

28. The system of claim 27 wherein the transaction server directly updates data on the legacy transaction system.

29. The system of claim 27 wherein the transaction server stores updates to data for delayed forwarding to the legacy transaction system.

30. A computer system for exchanging data between a user and a plurality of database transaction systems, comprising:
- on a client computer, an application program for displaying forms for exchanging information with the user under control of a remote communication bridge operable with disparate transaction systems in a manner using one query to support multiple transactions with different disparate transaction systems, each disparate transaction system associated with a health care trading partner and its database, and each disparate transaction system not directly connected to the other disparate transaction systems;
- a first set of programming instructions received from the communication bridge and executed by the application program to display a first specific form, wherein the first specific form is associated with a first disparate transaction system, the communication bridge operating on (i) a first set of data formatted for communicating with the application program to display the first specific form and to display a second form associated with another disparate transaction system different from the first transaction system, and (ii) a second set of data formatted for communicating with the first disparate transaction system and its database, and handling data conversion between (a) the format of the first set of data communicating with the application program as executed on the client computer and (b) the format of the second set of data communicating with the first disparate transaction system and its database.

31. The system of claim 30 wherein the application program is an Internet web browser.

32. The system of claim 30 further comprising a second set of instructions received from the communication bridge to display a second specific form, the second specific form being a result of input data to the first specific form.

33. The system of claim 32 wherein the second specific form is associated with a second disparate transaction system.

34. A method for exchanging data between a user and a database, comprising:
  interacting with the user through a user interface, the user interface receiving input data from the user;
  independently managing respective databases on a plurality of transaction systems, wherein each remote transaction system is not directly connected to other remote transaction systems in the plurality, and wherein each remote transaction system is associated with a health care trading partner and its respective database; and
  connecting a communication bridge with the user interface and remote transaction systems, the communication bridge operable with disparate transaction systems in a manner using one query to support multiple transactions with different remote transaction systems and including:
    communicating with the user interface using a first interaction system using a first set of data formatted for communicating with the user interface, and displaying a first form associated with a selected remote transaction system and its respective database and a second form associated with a different remote transaction system and its respective database; and
    communicating with the selected remote transaction system using a second interaction system including a second set of data formatted for communicating with the selected remote transaction system and its respective database, the communication bridge operating on the first and second sets of data and handling data conversion between (a) the format of the first set of data for communicating with the user interface and (b) the format of the second set of data formatted for communicating with the selected remote transaction system and its respective database.

35. The method of claim 34 where the user interface is a graphical user interface.

36. The method of claim 35 where the graphical user interface includes a browser.

37. The method of claim 34 wherein the databases are disparate.

38. The method of claim 34 wherein the selected remote transaction system includes processing logic responsive to the input data.

39. The method of claim 38 wherein the processing logic determines additional data to be input by the user.

40. The method of claim 34 further comprising a store of display forms, each display form soliciting input data from the user.

41. The method of claim 40 wherein a specific display form is communicated to the user interface in response to a business model of the selected remote transaction system.

42. The method of claim 41 wherein the specific display form is determined from input data.

43. The method of claim 34 wherein the first interaction system includes an Internet protocol.

44. The method of claim 34 wherein the second interaction system includes a messaging protocol.

45. The method of claim 34 wherein the communication bridge includes a third interaction system for communicating with a second selected remote transaction system.

46. A method for exchanging data between a user and a database, comprising:
  for a plurality of end user systems, providing each end user system with a user interface for presenting virtual forms for data collection and data display;
  providing a plurality of remote transaction systems with data stored in respective databases and a set of rules for using a plurality of forms to collect data for the respective databases, wherein each remote transaction system is not directly connected to other remote transaction systems in the plurality, and wherein each remote transaction system is associated with a health care trading partner; and
  disposing a communication bridge in communication with the end user systems and the remote transaction systems, the communication bridge operable with disparate transaction systems in a manner using one query to support multiple transactions with different disparate transaction systems and including:
    communicating with the remote transaction systems with a first data communication server using a first set of data formatted for communicating with the remote transaction systems and their respective databases, and displaying a first form associated with a selected remote transaction system and a second form associated with a different remote transaction system;
    communicating with the end user systems with a second data communication server using a second set of data formatted for communicating with the end user systems; and
    connecting a network structure with the first server and the second server, the communication bridge operating on the first and second sets of data and handling data conversion between (a) the format of the first set of data communicating with the remote transaction systems and their respective databases and (b) the format of the second set of data communicating with the end user systems.

47. The method of claim 46 wherein a virtual form is presented to the user under command of the set of rules of a specific remote transaction system.

48. The method of claim 47 wherein input data collected from the user by the virtual form is stored in the database of the specific remote transaction system.

49. The method of claim 47 wherein the communication bridge derives the specific remote transaction system from input data collected from the user by a previously presented virtual form.

50. The method of claim 46 wherein the second server is an Internet web server.

51. The method of claim 46 wherein the first server includes a conversational interface to the remote transaction systems.

52. The method of claim 46 wherein the communication bridge manages exchanges of information between one end user system and many remote transaction systems.

53. The method of claim 52 wherein the one-to-many relationship completes a single transaction for the end user system.

54. The method of claim 46 wherein the remote transaction system includes a legacy transaction system.

55. The method of claim 54 wherein the remote transaction system further includes a transaction server in communication with the first server.

56. The method of claim 55 wherein the transaction server directly updates data on the legacy transaction system.

57. The method of claim 55 wherein the transaction server stores updates to data for delayed forwarding to the legacy transaction system.

58. A computer method for exchanging data between a user and a plurality of database transaction systems, comprising:
  on a client computer, providing an application program for displaying forms for exchanging information with the user under control of a remote communication bridge operable with disparate transaction systems in a manner using one query to support multiple transactions with different disparate transaction systems and their respective databases, each disparate transaction system associated with a health care trading partner, and each disparate transaction system not directly connected to the other disparate transaction systems and their respective databases;
  receiving a first set of programming instructions from the communication bridge; and
  in the application program, executing the first set of programming instructions to display a first specific form, wherein the first specific form is associated with a first disparate transaction system, the communication bridge operating on (i) a first set of data formatted for communicating with the application program to display the first specific form and a second form associated with another disparate transaction system different from the first disparate transaction system, and (ii) a second set of data formatted for communicating with the first disparate transaction system and handling data conversion between (a) the format of the first set of data communicating with the client computer application program and (b) the format of the second set of data communicating with the first disparate transaction system and its respective database.

59. The method of claim 58 wherein the application program is an Internet web browser.

60. The method of claim 58 further comprising a second set of instructions received from the communication bridge to display a second specific form, the second specific form being a result of input data to the first specific form.

61. The method of claim 60 wherein the second specific form is associated with a second disparate transaction system.

62. An article of manufacture, comprising:
  a computer storage readable medium; and
  a set of instructions carried on the medium for exchanging data between a user and a database, comprising instructions for:
    interacting with the user through a user interface, the user interface receiving input data from the user;
    independently managing respective databases on a plurality of remote transaction systems, wherein each remote transaction system is not directly connected to other remote transaction systems in the plurality, and wherein each remote transaction system is associated with a health care trading partner; and
    connecting a communication bridge with the user interface and remote transaction systems, the communication bridge operable with disparate transaction systems in a manner using one query to support multiple transactions with different disparate transaction systems and including:
      communicating with the user interface using a first interaction system having a first set of data formatted for communicating with the user interface, and displaying a first form associated with a selected transaction system and a second form associated with a different transaction system; and
      communicating with the selected remote transaction system using a second interaction system having a second set of data formatted for communicating with the selected remote transaction system and its respective database, the communication bridge operating on the first and second sets of data and handling data conversion between (a) the format of the first set of data communicating with the user interface and (b) the format of the second set of data communicating with the selected remote transaction system and its respective database.

63. An article of manufacture, comprising:
  a computer storage readable medium, and
  a set of instructions carried on the medium for exchanging data between a user and a database, comprising instructions for:
  providing for a plurality of end user systems, each of a plurality of end user systems with a user interface for presenting virtual forms for data collection and data display;
  providing each of a plurality of transaction systems with data stored in respective databases and a set of rules for using a plurality of forms to collect data for the databases, each transaction system associated with a health care trading partner, and each transaction system not directly connected to other transaction systems in the plurality; and
  disposing a communication bridge in communication with the end user systems and the transaction systems, the communication bridge operable with disparate transaction systems in a manner using one query to support multiple transactions with different disparate transaction systems and including:
    communicating with the transaction systems with a first data communication server using a first set of data formatted for communicating with the transaction systems and their respective databases, and displaying a first form associated with a selected transaction system and a second form associated with another transaction system;
    communicating with the end user systems with a second data communication server using a second set of data formatted for communicating with the end user systems; and
    connecting a network structure with the first server and the second server, the communication bridge operating on the first and second sets of data and handling data conversion between (a) the format of the first set of data communicating with the transaction systems and their respective databases and (b) the format of the second set of data for communicating with the end user systems.

64. An article of manufacture, comprising:
a computer storage readable medium; and
a set of instructions carried on the medium for exchanging data between a user and a plurality of database transaction systems, wherein each database transaction system is not directly connected to other database transaction systems in the plurality, and wherein each database transaction system is associated with a health care trading partner, comprising instructions for:
- on a client computer, operating an application program for displaying forms for exchanging information with the user under control of remote communication bridge operable with disparate database transaction systems in a manner using one query to support multiple transactions with different disparate database transaction systems;
- receiving a first set of programming instructions from the communication bridge; and
- in the application program, executing the first set of programming instructions to display a first specific form, wherein the first specific form is associated with a first database transaction system, the communication bridge operating on (i) a first set of data formatted for communicating with the application program to display the first specific form and a second form associated with another database transaction system different from the first database transaction system, and (ii) a second set of data formatted for communicating with the first database transaction system and handling data conversion between (a) the format of the first set of data communicating with the application program and (b) the format of the second set of data communicating with the first database transaction system.

65. The article of claim 64 wherein the application program is an Internet web browser.

66. The article of claim 64 further comprising a second set of instructions received from the communication bridge to display a second specific form, the second specific form being a result of input data to the first specific form.

67. The article of claim 66 wherein the second specific form is associated with a second database transaction system.

68. A system for exchanging data between a user and a database, comprising:
- a graphical user interface for interacting with the user, the graphical user interface receiving input data from the user, the user being a supplier of health care services;
- a plurality of remote health care trading partners, each health care trading partner independently managing a respective database, the databases being disparate and not directly connected to the databases of other health care trading partners in the plurality;
- a store of display forms, each display form soliciting input from the user, a specific display form determined from input data is communicated to the graphical user interface in response to rules and procedures of the selected health care trading partner; and
- a communication bridge in connection with the user interface and the health care trading partners, the communication bridge operable with disparate transaction systems in a manner using one query to support multiple transactions with different disparate transaction systems and including:
  - a first interaction system including an Internet protocol set of data formatted for communicating with the user interface, and displaying a first form associated with a selected transaction system and a second form associated with another transaction system, the selected transaction system being of a certain health care trading partner; and
  - a second interaction system including a messaging protocol set of data formatted for communicating with the certain health care trading partner and its respective database, the communication bridge operating on the sets of data of the first and second interaction systems and handling data conversion between (a) the format of the Internet protocol set of data communicating with the user interface and (b) the format of the messaging protocol set of data communicating with the certain health care trading partner and its respective database.

69. A method for exchanging data between a user and a database, comprising:
- interacting with the user through a graphical user interface, the graphical user interface receiving input data from the user, the user being a supplier of health care services;
- on a plurality of remote health care trading partners, independently managing a respective database on each health care trading partner, the databases being disparate and not directly connected to the databases of other health care trading partners in the plurality;
- storing display forms, each display form soliciting input data from the user, a specific display form determined from input communicated to the graphical user interface in response to rules and procedures of the selected health care trading partner; and
- connecting a communication bridge with the user interface and health care trading partners, the communication bridge operable with disparate transaction systems in a manner using one query to support multiple transactions with different disparate transaction systems and including:
  - communicating with the user interface using a first interaction system including an Internet protocol set of data, and displaying a first form associated with a selected transaction system and a second form associated with another transaction system, the selected transaction system being of a certain health care trading partner; and
  - communicating with the certain health care trading partner using a second interaction system including a messaging protocol set of data, the communication bridge operating on the sets of data of the first and second interaction systems and handling data conversion between (a) the format of the Internet protocol set of data communicating with the user interface and (b) the format of the messaging protocol set of data communicating with the certain health care trading partner and its respective database.

70. An article of manufacture, comprising:
a computer storage readable medium; and
a set of instructions carried on the medium for exchanging data between a user and a database, comprising instructions for:
- interacting with the user through a graphical user interface, the graphical user interface receiving input data from the user, the user being a supplier of health care services;
- on a plurality of remote health care trading partners, independently managing a respective database, the databases being disparate and not directly connected to the databases of other health care trading partners in the plurality;

storing display forms, each display form soliciting input data from the user, a specific display form determined from input communicated to the graphical user interface in response to rules and procedures of the selected health care trading partner; and connecting a communication bridge with the user interface and health care trading partners, the communication bridge operable with disparate transaction systems in a manner using one query to support multiple transactions with different disparate transaction systems and including:

communicating with the user interface using a first interaction system including an Internet protocol set of data, and displaying a first form associated with a selected transaction system and a second form associated with another transaction system, the selected transaction system being of a certain health care trading partner; and communicating with the certain health care trading partner and its respective database using a second interaction system including a messaging protocol set of data, the communication bridge operating on the sets of data of the first and second interaction systems and handling data conversion between (a) the format of the Internet protocol set of data communicating with the user interface and (b) the format of the messaging protocol set of data communicating with the certain health care trading partner and its respective database.

* * * * *